United States Patent [19]

Moskovitz et al.

[11] Patent Number: 5,985,790
[45] Date of Patent: Nov. 16, 1999

[54] METHOD OF MAKING ACID CONTACTED ENHANCED ALUMINUM OXIDE ADSORBENT PARTICLE

[75] Inventors: Mark L. Moskovitz; Bryan E. Kepner, both of Atlanta, Ga.

[73] Assignee: Project Earth Industries, Inc., Atlanta, Ga.

[21] Appl. No.: 08/734,331

[22] Filed: Oct. 21, 1996

[51] Int. Cl.[6] ............................. B01J 20/00; B01J 23/32; B01J 23/70
[52] U.S. Cl. .................... 502/415; 502/400; 502/408; 502/414; 502/324; 502/336; 502/338; 502/345; 502/349; 502/350; 502/353; 502/355; 423/626; 423/628; 423/604; 423/605; 423/608; 423/610
[58] Field of Search .................................. 502/355, 408, 502/345, 349, 350, 353, 415, 400, 414, 324, 336, 338; 423/626, 628, 604, 605, 608, 610

[56] References Cited

U.S. PATENT DOCUMENTS

| | | |
|---|---|---|
| 2,915,365 | 12/1959 | Saussol ..................................... 23/142 |
| 3,158,578 | 11/1964 | Pons et al. ............................... 252/436 |
| 3,222,129 | 12/1965 | Osment et al. ........................... 23/141 |
| 3,360,134 | 12/1967 | Pullen ...................................... 210/502 |
| 3,485,771 | 12/1969 | Horvath .................................... 252/430 |
| 3,726,811 | 4/1973 | Toombs et al. ........................... 252/463 |
| 3,819,532 | 6/1974 | Cracknell et al. ........................ 252/447 |
| 3,875,125 | 4/1975 | Whitehurst ......................... 260/79.5 R |
| 3,935,098 | 1/1976 | Oda et al. ................................. 210/38 |
| 3,945,945 | 3/1976 | Kiovsky et al. .......................... 252/463 |
| 3,958,341 | 5/1976 | Podschus ................................. 34/12 |
| 3,997,476 | 12/1976 | Cull ......................................... 252/463 |
| 4,017,425 | 4/1977 | Shiao ....................................... 252/453 |
| 4,051,072 | 9/1977 | Bedford et al. .......................... 252/464 |
| 4,125,457 | 11/1978 | Brennan et al. ......................... 208/254 |
| 4,166,100 | 8/1979 | Vorobiev et al. ........................ 423/626 |
| 4,177,139 | 12/1979 | Hahn et al. .............................. 210/33 |
| 4,349,637 | 9/1982 | Miedaner et al. ....................... 501/126 |
| 4,393,311 | 7/1983 | Feldman et al. ...................... 250/459.1 |
| 4,442,223 | 4/1984 | Chester et al. ........................... 502/68 |
| 4,499,208 | 2/1985 | Fuderer ................................... 502/415 |
| 4,508,835 | 4/1985 | Kaniuk et al. ........................... 501/94 |
| 4,547,487 | 10/1985 | Vogel et al. ............................. 502/351 |
| 4,551,254 | 11/1985 | Imada et al. ............................ 210/688 |
| 4,558,031 | 12/1985 | Ternan et al. ........................... 502/355 |
| 4,579,839 | 4/1986 | Pearson ................................... 502/439 |
| 4,764,394 | 8/1988 | Conrad . |
| 4,795,735 | 1/1989 | Liu et al. ................................. 502/415 |
| 4,835,338 | 5/1989 | Liu ........................................... 585/823 |
| 4,843,034 | 6/1989 | Herndon et al. ........................ 437/189 |
| 4,874,596 | 10/1989 | Lemelson . |
| 4,885,065 | 12/1989 | Gilgenbach . |
| 4,902,666 | 2/1990 | Rainis ...................................... 502/439 |
| 4,923,843 | 5/1990 | Saforo et al ............................. 502/415 |
| 5,087,589 | 2/1992 | Chapman et al. ....................... 437/195 |
| 5,133,871 | 7/1992 | Levy ........................................ 210/688 |
| 5,204,070 | 4/1993 | Wilson et al. ........................... 422/186 |
| 5,212,131 | 5/1993 | Belding ................................... 502/60 |
| 5,218,179 | 6/1993 | Matossian et al. .................. 219/121.43 |
| 5,227,358 | 7/1993 | Takemura et al. ....................... 502/316 |
| 5,236,471 | 8/1993 | Van Dijen ................................ 51/293 |
| 5,238,888 | 8/1993 | Abe . |
| 5,242,879 | 9/1993 | Abe et al. ................................ 502/180 |
| 5,244,648 | 9/1993 | Dupin et al. ............................ 423/626 |
| 5,262,198 | 11/1993 | Wu et al. ................................. 427/249 |
| 5,366,948 | 11/1994 | Absil et al. .............................. 502/68 |
| 5,414,204 | 5/1995 | Hosono et al. . |
| 5,422,323 | 6/1995 | Banerjee et al. ........................ 501/100 |
| 5,427,995 | 6/1995 | Ziebarth et al. ........................ 502/411 |

FOREIGN PATENT DOCUMENTS

| | | |
|---|---|---|
| 0 224 375 A2 | 6/1987 | European Pat. Off. . |
| 0 395 203 | 10/1990 | European Pat. Off. . |
| 0 525 631 A1 | 2/1993 | European Pat. Off. . |
| 2527197 | 5/1982 | France . |
| 53-31599 | 3/1976 | Japan . |
| 54-31586 | 3/1978 | Japan . |
| 54-10288 | 1/1979 | Japan . |
| 54-28287 | 3/1979 | Japan . |
| 54-141375 | 11/1979 | Japan . |
| 56-121637 | 9/1981 | Japan . |
| 56-121637 A2 | 9/1981 | Japan . |
| 61233065 | 10/1981 | Japan . |
| 57-171435 | 10/1982 | Japan . |
| 58-156349 | 9/1983 | Japan . |
| 60-255681 | 12/1985 | Japan . |
| 63-062546 | 3/1988 | Japan . |
| 1164781 | 6/1989 | Japan . |
| 4-23577 | 4/1992 | Japan . |
| 98720 | 4/1990 | Romania . |
| 604947 | 11/1945 | United Kingdom . |
| WO 94/26661 | 11/1994 | WIPO . |
| WO 96/17682 | 6/1996 | WIPO . |
| WO 96/33013 | 10/1996 | WIPO . |

OTHER PUBLICATIONS

Fukuzuka et al. Oxyacid Anion Adsorbent, 91: 9908p; Chemical Abstracts, vol. 91, 1979, p. 310.

Youssef et al. Oxidation of Carbon Monoxide Over Alumina–Supported Metal Oxide Catalysts, vol. 12, No. 4, pp. 335–343, 1995.

Sultan et al. Catalytic Dehydrogenation and Cracking of Cyclohexane over $Ni/Al_2O_3$ Solids, Adsorption Science & Technology, vol. 12, No. 1, pp. 1–6, 1995.

(List continued on next page.)

*Primary Examiner*—Walter D. Griffin
*Assistant Examiner*—In Suk Bullock
*Attorney, Agent, or Firm*—Needle & Rosenberg, P.C.

[57] ABSTRACT

This invention relates to a process for producing an enhanced adsorbent particle comprising contacting a non-amorphous, non-ceramic, crystalline, porous, calcined, aluminum oxide particle that was produced by calcining at a particle temperature of from 400° C. to 700° C., with an acid for a sufficient time to increase the adsorbent properties of the particle. A process for producing an enhanced adsorbent particle comprising contacting a non-ceramic, porous, oxide adsorbent particle with an acid for a sufficient time to increase the adsorbent properties of the particle is also disclosed. Particles made by the process of the instant invention and particle uses, such as remediation of waste streams, are also provided.

56 Claims, 1 Drawing Sheet

OTHER PUBLICATIONS

Jha et al. Chromatographic Utilization of the Sorption Behaviour of Some Nitophenols on Acid–treated Alumina, Absorption Science & Technology, vol. 9, No. 2, pp. 92–108, 1992.

Ames et al., "Phosphorous Removal From Effluents in Alumina Columns," *J. Water Pollution Control Federation*, vol. 42, No. 5, Part 2, pp. R161–R172 (May 1970).

Batchelor et al., "A Surface Complex Model for Adsorption of Trace Components from Wastewater," *J. Water Pollution Control Federation*, vol. 59, No. 12, pp. 1059–1068 (Dec. 1987).

Brattebo et al., "Phosphorous Removal by Granular Activated Alumina," *Wat. Res.*, vol. 20, No. 8, pp. 977–986 (1986).

Huang, "Removal of Phosphate by Powdered Aluminum Oxide Adsorption," *J. Water Pollution Control Federation*, vol. 7, pp. 1811–1817 (Aug. 1977).

Gangoli et al., "Phosphate Adsorption Studies," *J. Water Pollution Control Federation*, vol. 45, No. 5, pp. 842–849 (May 1973).

Gangoli et al., "Kinetics of Phosphate Adsorption on Alumina and Fly Ash," vol. 46, No. 8, pp. 2035–2042 (Aug. 1974).

Neufeld et al., "Removal of Orthophosphates from Aqueous Solutions with Activated Alumina," *Enviromental Science and Technology*, vol. 3, No. 7, pp. 661–667 (Jul. 1969).

Shiao et al., "Phosphate Removal from Aqueous Solution from Activated Red Mud," *J. Water Pollution Control Federation*, vol. 49, pp. 280–285 (Feb. 1977).

Urano et al., "Process Development for Removal and Recovery of Phosphorous from Wastewater by a New Adsorbent. 1. Preparation Method and Adsorption Capability of a New Adsorbent," *Ind. Eng. Chem. Res.*, vol. 30, No. 8, pp. 1893–1896 (1991).

Urano et al., "Process Development for Removal and Recovery of Phosphorus from Wastewater by a New Adsorbent. 2. Adsorption Rates and Breathrough Curves," *Ind. Eng. Chem. Res.*, vol. 30, No. 8, pp. 1897–1899 (1991).

Winkler et al., "Kinetics of Orthophosphate Removal from Aqueous Solutions by Activated Alumina," J. Water Pollution Control Federation, vol. 43, No. 3, Part 1, pp. 474–482 (Mar. 1971).

Yee, "Selective Removal of Mixed Phosphates by Activated Alumina," *J. Amer. Water Works Assoc.*, vol. 58, pp. 239–247 (1966).

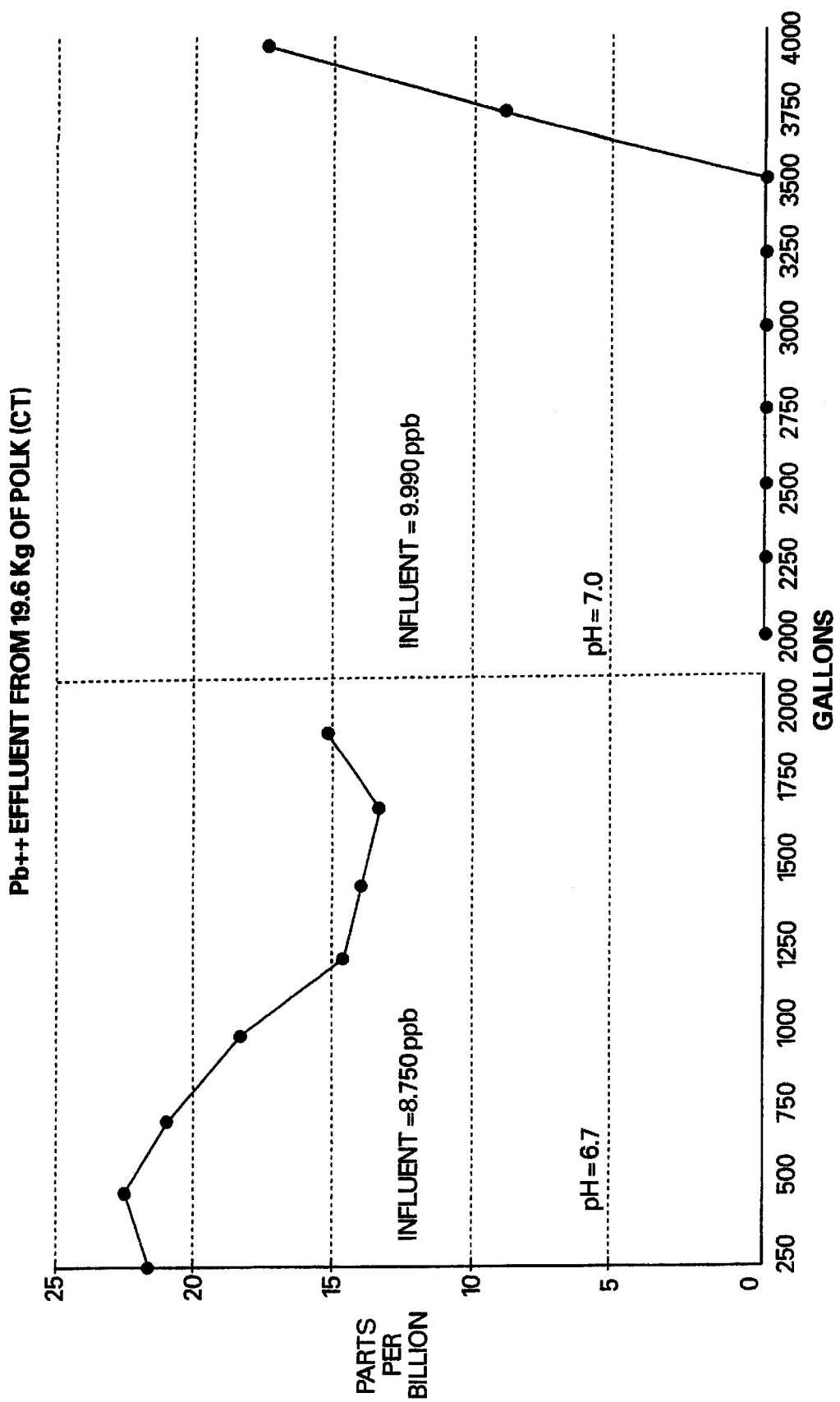

METHOD OF MAKING ACID CONTACTED ENHANCED ALUMINUM OXIDE ADSORBENT PARTICLE

CROSS-REFERENCE TO RELATED APPLICATIONS

This application is (1) a continuation-in-part of U.S. application Ser. No. 08/662,331, filed Jun. 12, 1996, abandoned, which is a continuation-in-part of PCT/US95/15829, filed Jun. 12, 1995, pending, which is a continuation-in-part of U.S. application Ser. No. 08/351,600, filed Dec. 7, 1994, abandoned and (2) a continuation-in-part of PCT/US95/15829, filed Jun. 12, 1995, pending, which is a continuation-in-part of U.S. application Ser. No. 08/351,600, filed Dec. 7, 1994, abandoned. All of the above applications are hereby incorporated by this reference in their entireties for all of their teachings.

BACKGROUND OF THE INVENTION

1. Field of the Invention

This invention relates generally to enhanced adsorbent particles, particularly particles that have been adsorbent enhanced by contacting with acid.

2. Background Art

Oxides of metals and certain non-metals are known to be useful for removing constituents from a gas or liquid stream by adsorbent mechanisms. For example, the use of activated alumina is considered to be an economical method for treating water for the removal of a variety of pollutants, gasses, and some liquids. Its highly porous structure allows for preferential adsorptive capacity for moisture and contaminants contained in gasses and some liquids. It is useful as a desiccant for gasses and vapors in the petroleum industry, and has also been used as a catalyst or catalyst-carrier, in chromatography and in water purification. Removal of contaminants such as phosphates by activated alumina are known in the art. See, for example, Yee, W., "Selective Removal of Mixed Phosphates by Activated Alumina," *J. Amer. Waterworks Assoc.*, Vol. 58, pp. 239–247 (1966).

U.S. Pat. No. 4,795,735 to Liu et al. discloses an activated carbon/alumina composite and a process for producing the composite. The composite is prepared by blending powders of each of the activated carbon and activated alumina constituents. After the blend is thoroughly mixed, an aqueous solution is added to permit the activated alumina to rehydratably bond to the carbon particles. The amount of water added does not exceed that which prevents the mix from being extruded or agglomerated. After the water is added, the mix is subjected to a shaping or a forming process using extrusion, agglomeration, or pelletization to form a green body. The green body is then heated to a temperature of 25–100° C. or higher. The composite may be strengthened by peptizing by adding nitric acid to the mixture. It is disclosed that the alumina can serve as the binder as well as the absorbent. This patent does not use a calcined alumina. Liu et al. discloses an amorphous alumina trihydrate powder, such as CP2 obtained from Alcoa and an amorphous alumina trihydrate powder such as CP-1 or CP-7, which are recited in U.S. Pat. No. 4,579,839, incorporated by reference in Liu et al. Liu et al.'s use of the term active refers to the surface water being dried and does not refer to a calcined particle. Liu et al. uses acid to strengthen the particle and not to enhance its adsorbent properties. Liu et al. uses an alumina precursor, which is an absorbent and not an adsorbent.

U.S. Pat. No. 3,360,134 to Pullen discloses a composition having adsorption and catalytic properties. Example 2 discloses an alumina hydrate formed by partially dehydrating alpha-alumina trihydrate in a rotary dryer by counter-current flow with a heated gas and an inlet temperature of about 1200° F. and an outlet temperature of about 300° F. The resulting product was washed with 5% sulfuric acid, rinsed with water and dried to about 2% free water content. Solid sucrose was mixed with the hydrate and the mixture heated. Example 4 discloses that the procedure of Example 2 was repeated except that calcined alumina was used. The product was unsuitable when calcined alumina was used. Thus, the acid washed product of Example 2 was not a calcined alumina.

U.S. Pat. No. 4,051,072 to Bedford et al. discloses a ceramic alumina that can be treated with very dilute acid to neutralize the free alkaline metal, principally $Na_2O$, to enable impregnation with catalytic material to a controlled depth of from at least 90 to about 250 microns. This patent does not use a crystallized aluminum oxide that has been calcined in accordance with the instant invention. This patent calcines the particle at a temperature of from about 1700° F. to about 1860° F. (927° C. to 1016° C.) to form a ceramic material, specifically what is referred to herein as an alpha alumina.

U.S. Pat. No. 5,242,879 to Abe et al. discloses that activated carbon materials, which have been subjected to carbonization and activation treatments, and then further subjected to an acid treatment and a heat treatment, have a high catalytic activity and are suitable as catalysts for the decomposition of hydrogen peroxide, hydrazines or other water pollutants such as organic acids, quaternary ammonium-salts, and sulfur-containing compounds. Acid is used to remove impurities and not to enhance the adsorbent features. This patent also does not utilize a particle of the instant invention.

Adsorbent particles of the prior art have not achieved the ability to remove particular contaminants from a liquid or gas stream, such as, for example, a waste stream or drinking water, to acceptably low levels. Additionally, the adsorbent particles of the prior art have not been able to bind tightly to particular contaminants so that the adsorbent particle/contaminant composition can be safely disposed of in a landfill. Thus, there has been a need in the art for adsorbents that have improved ability to adsorb particular materials, particularly contaminants from a gas or liquid stream, to thereby purify the stream. There has been a need in the art for the adsorbent particles to tightly bind to the adsorbed contaminant.

SUMMARY OF THE INVENTION

In accordance with the purpose(s) of this invention, as embodied and broadly described herein, this invention, in one aspect, relates to a process for producing an enhanced adsorbent particle comprising contacting a non-amorphous, non-ceramic, crystalline, porous, calcined, aluminum oxide particle that was produced by calcining at a particle temperature of from 400° C. to 700° C., with an acid for a sufficient time to increase the adsorbent properties of the particle.

The invention further provides a process for producing an enhanced adsorbent particle comprising contacting a non-ceramic, porous, oxide adsorbent particle with an acid for a sufficient time to increase the adsorbent properties of the particle.

In yet another aspect, the invention provides for particles made by the process of the instant invention.

In yet another aspect, the invention provides for a process for reducing or eliminating the amount of contaminants in a stream comprising contacting the particle of the invention with the stream for a sufficient time to reduce or eliminate the contamination from the stream.

In still yet another aspect, the invention provides a composition comprising the particles of the invention.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

FIG. 1 is a graph showing the reduction in concentration of lead ions using a particle of the invention.

DESCRIPTION OF THE PREFERRED EMBODIMENTS

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

The term "particle" as used herein is used interchangeably throughout to mean a particle in the singular sense or a combination of smaller particles that are grouped together into a larger particle, such as an agglomeration of particles.

The term "ppm" refers to parts per million and the term "ppb" refers to parts per billion.

In accordance with the purpose(s) of this invention, as embodied and broadly described herein, this invention, in one aspect, relates to a process for producing an enhanced adsorbent particle comprising contacting a non-amorphous, non-ceramic, crystalline, porous, calcined, aluminum oxide particle that was produced by calcining at a particle temperature of from 400° C. to 700° C., with an acid for a sufficient time to increase the adsorbent properties of the particle. This process can also consist essentially of or consist of the particular process steps as described above or further including the additional features described below.

The invention further provides a process for producing an enhanced adsorbent particle comprising contacting a non-ceramic, porous, oxide adsorbent particle with an acid for a sufficient time to increase the adsorbent properties of the particle. This process can also consist essentially of or consist of the particular process steps as described above or further including the additional features described below. In one embodiment, this particle is calcined.

In yet another aspect, the invention provides for particles made by the process of the instant invention.

In yet another aspect, the invention provides for a process for reducing or eliminating the amount of contaminants in a stream comprising contacting the particle of the invention with the stream for a sufficient time to reduce or eliminate the contamination from the stream.

In still yet another aspect, the invention provides a composition comprising the particles of the invention.

The particles of this invention have improved or enhanced adsorptive features. The particles of this invention can adsorb a larger amount of adsorbate per unit volume or weight of adsorbent particles than a non-enhanced particle. Also, the particles of this invention can reduce the concentration of contaminants or adsorbate material in a stream to a lower absolute value than is possible with a non-enhanced particle. In particular embodiments, the particles of this invention can reduce the contaminant concentration in a stream to below detectable levels, believed to be never before achievable with prior art particles. Enhanced adsorptive features is intended to particularly include ion capture and ion exchange mechanisms. Ion capture refers to the ability of the particle to irreversibly bind to other atoms by covalent or ionic interactions. In this invention, the ion capture typically predominates over the ion exchange property, and it is typically the improved ion capture property that improves the adsorbent performance of the particle. Adsorption is a term well known in the art and should be distinguished from absorption. The adsorbent particles of this invention chemically bond to and very tightly retain the adsorbate material. These chemical bonds are ionic and/or covalent bonds.

Not wishing to be bound by theory, it is believed that the acid contacting of the particle enhances the adsorptive capacity of the particle by increasing the number of hydroxyl groups on the particle. With cationic and anionic contaminants, the hydroxyl groups provide sites for chemical bonding or replacement, such that the contaminants bond irreversibly with the particle. In general, the increased amount of hydroxyl groups generate more active sites for the contaminant to bond with.

The invention contemplates the use of any prior art adsorbent and/or catalyst particle or composite particle of two or more types of particles. In a preferred embodiment, the particle comprises an oxide particle, even more preferably a non-ceramic, porous oxide particle. The particle in one embodiment comprises a metal or metalloid oxide particle. Examples of such particles include, but are not limited to, oxide complexes, such as transition metal oxides, lanthanide oxides, thorium oxide, as well as oxides of Group IIA (Mg, Ca, Sr, Ba), Group IIIA (B, Al, Ga, In, Tl), Group IVA (Si, Ge, Sn, Pb), and Group VA (As, Sb, Bi). In another embodiment, the particle comprises an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite. Typically, any oxidation state of the oxide complexes may be useful for the present invention. The oxide can be a mixture of at least two metal oxide particles having the same metal with varying stoichiometry and oxidation states. In one embodiment, the particle comprises $Al_2O_3$, $TiO_2$, $CuO$, $Cu_2O$, $V_2O_5$, $SiO_2$, $MnO_2$, $Mn_2O_3$, $Mn_3O_4$, $ZnO$, $WO_2$, $WO_3$, $Re_2O_7$, $As_2O_3$, $As_2O_5$, $MgO$, $ThO_2$, $Ag_2O$, $AgO$, $CdO$, $SnO_2$, $PbO$, $FeO$, $Fe_2O_3$, $Fe_3O_4$, $Ru_2O_3$, $RuO$, $OsO_4$, $Sb_2O_3$, $CoO$, $Co_2O_3$, $NiO$ or zeolite. In a further embodiment, the particle further comprises a second type of adsorbent and/or catalyst particles of an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite, activated carbon, including coal and coconut carbon, peat, zinc or tin. In another embodiment, the particle further comprises a second type of adsorbent and/or catalyst particles of aluminum oxide, titanium dioxide, copper oxide, vanadium pentoxide, silicon dioxide, manganese dioxide, iron oxide, zinc oxide, zeolite, activated carbon, peat, zinc or tin particle. Typical zeolites used in the present invention include "Y" type, "beta" type, mordenite, and ZsM5. In a preferred embodiment, the particle comprises non-amorphous, non-ceramic, crystalline, porous, calcined aluminum oxide that was produced by calcining the precursor to the calcined aluminum oxide at a particle temperature of from 400° C. to 700° C., preferably in the gamma, chi-rho, or eta form. The precursor to calcined aluminum oxide can include but is not limited to boehmite, bauxite, pseudo-boehmite, scale, $Al(OH)_3$ and alumina hydrates. In the case of other metal oxide complexes, these complexes can also be calcined or uncalcined.

In another embodiment of the invention, in the particle of this invention, typically any adsorbent particle that is non-ceramic, porous, is an oxide can be used. Some of the particles of this invention are in the crystalline form and are therefore non-amorphous. Adsorbent particles that are very rigid or hard, are not dissolved to any detrimental degree by the acid, and which have initially high, pre-enhanced adsorptive properties are preferred. Examples of such particles include, but are not limited to, metal oxides, such as transition metal oxides and Group IIA, Group IIIA, and Group IVA metal oxides (CAS Group notation), and oxides of non-metals such as silicon and germanium. Preferred adsorbents include oxides of aluminum, silicon, including zeolites, both natural and synthetic, manganese, copper, vanadium, zirconium, iron, and titanium. Even more preferred adsorbents include aluminum oxide ($Al_2O_3$), silicon dioxide ($SiO_2$), manganese oxides (MnO, $MnO_2$, $Mn_2O_3$, and $Mn_3O_4$), copper oxides (CuO and $Cu_2O$), vanadium pentoxide ($V_2O_5$), zirconium oxide ($ZrO_2$), iron oxides FeO, $Fe_2O_3$, and $Fe_3O_4$), and titanium dioxide ($TiO_2$). In a preferred embodiment, the particle is microporous, even more preferably substantially microporous, having a median micropore size preferably of from 3.5 nm to 35 nm (35 Å to 350 Å) diameter.

In an even more preferred embodiment, the oxide is aluminum oxide ($Al_2O_3$) that has been produced by calcining at a particle temperature of from 400° C. to 700° C. In other embodiments, the lower limit of calcining temperature is 400° C., 450° C., 500° C., 550° C., 600° C., or 650° C. and the upper limit is 650° C., 600° C., 550° C., 500° C., or 450° C. These preferred aluminum oxide particles are preferably in the gamma, chi-rho, or eta forms. The ceramic form of $Al_2O_3$, such as the alpha form, are not included as a part of this invention. In a preferred embodiment, the $Al_2O_3$ particles of this invention are substantially microporous, having a median micropore size of from 3.5 nm to 35 or 50 nm diameter, even more preferably 60 nm, and a BET surface area of from 120 to 350 $m^2/g$.

In one embodiment, the particle is aluminum oxide that has been pre-treated by a calcination process. Calcined aluminum oxide particles are well known in the art. They are particles that have been heated to a particular temperature to form a particular crystalline structure. Processes for making calcined aluminum oxide particles are well known in the art as disclosed in, e.g., *Physical and Chemical Aspects of Adsorbents and Catalysts,* ed. Linsen et al., Academic Press (1970), which is incorporated by reference herein. In one embodiment, the Bayer process can be used to make aluminum oxide precursors. Also, pre-calcined aluminum oxide, that is, the aluminum oxide precursor (e.g., $Al(OH)_3$ or aluminum trihydrate, boehmite, pseudo-boehmite, bauxite), and calcined aluminum oxide are readily commercially available Calcined aluminum oxide can be used in this dried, activated form or can be used in a partially or near fully deactivated form by allowing water to be adsorbed onto the surface of the particle. However, it is preferable to minimize the deactivation to maximize the adsorbent capability. In some references in the prior art, "activated" refers only to the surface water being removed from the particle to increase its adsorbent ability. However, as used in reference to the instant invention, "activated" oxide particles refer to an oxide particle that has first been calcined and is then also preferably but not necessarily maintained in its dried state. Thus, as used herein, all active particles of the invention have also been calcined. The particles are not limited to any physical form and can be in the particulate, powder, granular, pellet, or the like form.

In another embodiment, in addition to being acid enhanced, the adsorbent, catalyst, and adsorbent and catalyst particles used in this invention can be enhanced by other processes known in the art or described below. For example the particles can be dried to be activated or can be treated by processes disclosed in the prior filed parent applications of and in applicants' copending application filed on the same date as this application and entitled "Enhanced Adsorbent and Room Temperature Catalyst Particle and Method of Making and Using Therefor," which is a continuation-in-part of PCT/US96/05303, filed Apr. 17, 1996, pending, which is a continuation-in-part of U.S. application Ser. No. 08/426,981, filed Apr. 21, 1995, pending, the disclosures of this above-mentioned application filed on the same date as this application and all of its prior filed priority applications are herein incorporated by this reference in their entireties for all of their teachings.

The acid that can be used in this invention can be any acid or mixture of acids that can catalyze the formation of hydroxyl groups onto the surface of the pores of the oxide particle. Examples of such acids include, but are not limited to, nitric acid, sulfuric acid, hydrochloric acid, boric acid, acetic acid, formic acid, phosphoric acid, and mixtures thereof. In a preferred embodiment, the acid is acetic acid because it is relatively safer to handle than most other acids and because of its cost effectiveness.

Typically the acid is diluted with water to prevent dissolution of the particle and for cost effectiveness. In general, only a dilute solution of the acid is required to achieve maximum or saturated loading of the ion moieties on the particle. For example, a 0.5 wt. % (0.09N; pH of about 2.9) and even a 0.1 wt. % (0.02N; pH of about 3.25) acetic acid solution has been found effective. However, a wide range of concentrations of acid can be used in this invention from very dilute to very concentrated depending on the hazards involved and the economics of production. However, if the acid is too concentrated, it will etch the particle causing an increase in macropores while eliminating micropores, which is detrimental to the particles of this invention. Thus, the acid treatment is preferably of a concentration (i.e. acid strength as measured by, e.g., normality or pH), acid type, temperature and length of time to be more than a mere surface wash but less than an etching. In particular embodiments, the etching of the particle is minimized or is only nominal by selection of the acid treatment conditions, such as acid strength, acid type, and temperature and time of treatment, such that the reduction in overall surface area, as preferably measured by the BET method, is less than 20%, less than 15%, less than 10%, less than 5%, less than 2%, less than 1%, or less than 0.5%. Strong acids, such as for example hydrochloric, nitric or sulfuric, should preferably be used at a concentration or strength lower than a weak acid, such as for example acetic acid, because the strong acid tends to chemically react with and etch the particle to a much greater degree than a weak acid of comparable concentration.

In a particular embodiment, the acid is of an upper strength equivalent to a 0.5N (normality) aqueous solution of acetic acid. In other embodiments, the upper strength of the acid is equivalent to a 0.25N, 0.1N, 0.09N, 0.075N, 0.05N, 0.02N, 0.01N, 0.005N or 0.001N aqueous acetic acid solution. The lower strength of the acid should be that which provides more than a surface washing but imparts enhanced adsorbent effects to the particle. In particular embodiments, the lower strength of the acid is equivalent to a 0.25N, 0.1N, 0.09N, 0.075N, 0.05N, 0.02N, 0.01N, 0.005N, 0.001N, 0.0005N, or 0.0001N aqueous acetic acid solution.

After acid treatment, the resultant particle of the invention substantially retains the micropores originally present and the acid does not etch the particle to any appreciable degree and does not create any appreciable amount of new macropores (median pore diameter greater than about 35 nm). In a preferred embodiment, when the particle is aluminum oxide, the acid treated aluminum oxide maintains its microporous nature, having a median pore size of 3.5 nm to 35 nm diameter and a BET surface area of from 120 to 350 $m^2/g$.

Additionally, the acid preferably has some water present to provide $OH^-$ and/or $H^+$ ions, which bond with the particle. When the acid is diluted with water, the water is preferably distilled water to minimize the amount of impurities contacting the particle.

The particle of the invention is made by the following process. The particle is contacted with an acid. The particle can be contacted with the acid by various means including by the particle being dipped in, extensively washing with, or submerged in the acid. The length of time the particle must be contacted with the acid varies according to the ability of the particular particle to generate hydroxyl groups on the surface and pores of the particle. The time can be as low as 30 seconds, a few (three) minutes, at least 15 minutes, at least one hour, at least 6 hours, at least 12 hours, or at least one day, to achieve adequate adsorption results and/or to preferably assure saturation. The time must be sufficient to at least increase the adsorbent properties of the particle by adding increasing the number of hydroxyl groups on the particle. In one embodiment, the particle is submerged in the acid, and saturation is typically complete when is full adsorption of the alumina pores with the acid solution. The contacting should be substantial enough to provide penetration of the acid throughout the pores of the particle thereby increasing the number of hydroxyl groups on the pore surface of the particle. Mere washing the outside surface of the particle to remove impurities is not sufficient to provide adequate penetration of the acid into and throughout the pores of the particle.

Typically, the acid contacting is preformed at room temperature. The higher the acid temperature and concentration, the more likely the acid will detrimentally etch the particle.

The acid contacted particle is then optionally rinsed, preferably with water. Rinsing of the acid contacted particle does not reduce the enhanced adsorptive capability of the particle. When rinsed, the particle is preferably rinsed with distilled water to ninimize impurity contact. Rinsing of the particle serves two purposes. First, any residual acid that is remaining on the surface or pores of the particle is removed, which will make the particle easier to handle when it is in the dry form. Second, rinsing the particle will remove the counter-ion of the acid that may be on the surface or pores of the particle.

Optionally, the particle is dried by a low to moderate heat treatment to remove excess liquid, such as acid or water, from the rinsing step to thereby increase the activity of adsorption. Typically, the drying is from about 50° C. to about 200° C. Drying of the particle also reduces the transfer cost of particle. However, the particle is preferably not calcined or recalcined after acid treatment. Such recalcining would detrimentally change the surface characteristics by closing up the micropores. Additionally, the particles of the invention are preferably not sintered, either before or after the acid treatment step, as this would detrimentally affect the micropores by closing up the micropores and would detrimentally decrease the pore volume and surface area. Any other process, such as a heat treatment, that would increase the size or eliminate micropores, enlarge the size of, create or destroy macropores, or would decrease the surface area available for adsorption or catalysis should preferably be avoided, particularly, after the particle is acid treated.

The size of the particles used in this invention can vary greatly depending on the end use. Typically, for adsorption or catalytic applications, a small particle size such as 20 μm is preferable because they provide a larger surface area per unit volume than large particles. Typically for adsorption or catalytic applications, the particle size range is from 50 μm to 5000 μm.

The particle of this invention can be used in any adsorption or ion capture application known to those of ordinary skill in the art. In one embodiment, the particle is used for environmental remediation applications. In this embodiment, the particle can be used to remove contaminants, such as, but not limited to, heavy metals, organics, including hydrocarbons, chlorinated organics, including chlorinated hydrocarbons, inorganics, or mixtures thereof Specific examples of contaminants include, but are not limited to, acetone, microbials such as cryptosporidium, ammonia, benzene, chlorine, dioxane, ethanol, ethylene, formaldehyde, hydrogen cyanide, hydrogen sulfide, methanol, methyl ethyl ketone, methylene chloride, propylene, styrene, sulfur dioxide, toluene, vinyl chloride, arsenic, lead, iron, phosphates, selenium, cadmium, uranium, radon, 1,2-dibromo-3-chloropropane (DBCP), chromium, tobacco smoke, cooking fumes, zinc, trichloroethylene, and PCBs. The particle of this invention can remediate individual contaminants or multiple contaminants from a single source. In essence, anywhere adsorbents are used to capture pollutants, this invention achieves improved efficiency by adsorbing a higher amount of contaminants and by reducing the contamination level to a much lower value than by non-enhanced particles.

For environmental remediation applications, particles of the invention are typically placed in a container, such as a filtration unit. The contaminated stream enters the container at one end, contacts the particles within the container, and the purified stream exits through the other end of the container. The particles contact the contaminants within the stream and bond to and remove the contamination from the stream. Typically, the particles become saturated with contaminants over a period of time, and the particles must be removed from the container and replaced with fresh particles. The contaminant stream can be a gas stream or liquid stream, such as an aqueous stream. The particles can be used to remediate, for example, waste water, production facility effluent, smoke stack gas, auto exhaust, drinking water, and the like.

The particle of the invention can be used alone, in combination with other particles prepared by the process of the invention, and/or in combination with other adsorbent, catalytic, or contaminant remediation particles known in the art. The particles can be combined in a physical mixture or agglomerated using techniques known in the art, such as with a binder, to form a multifunctional composite particle.

The particle/binder system of the invention can be used preferably as the adsorbent or catalytic medium itself. In an alternate embodiment, the system is used as an adsorbent or catalytic support.

In one embodiment, the acid enhanced particle is used in combination with a particle that has been pretreated to improve its adsorbent and/or to improve or impart catalyst properties, such as an ion or electron enhancement, in accordance with applicants' copending application filed on the same date as this application and entitled "Enhanced Adsorbent and Room Temperature Catalyst Particle and Method of Making and Using Therefor," which is a continuation-in-part of PCT/US96/05303, filed Apr. 17, 1996, pending, which is a continuation-in-part of U.S. patent application Ser. No. 08/426,981, filed Apr. 21, 1995, abandoned, all applications which are herein incorporated by this reference for all of its teachings.

In another embodiment, the acid enhanced particle of the invention is used in combination with a noble metal known in the art for adsorbent or particularly catalytic properties. Such noble metals include gold, silver, platinum, palladium, iridium, rhenium, rhodium, cobalt, copper, ruthenium, and osmium, preferably gold, silver platinum, and palladium. Such a combination can be used to take advantage of the adsorbent properties of the acid enhanced particle and the catalytic properties of the noble metal.

In one embodiment, the invention is directed to a composition comprising an aluminum oxide particle made by the acid enhancing process of the invention. In a further embodiment, this composition further comprises a co-particle. This co-particle is preferably any adsorbent or catalyst particle known in the art. Such co-particles can be preferably non-ceramic, porous, oxide adsorbent particles or activated carbon, more preferably silicon dioxide, or a metal oxide, such as manganese oxides ($MnO$, $MnO_2$, $Mn_2O_3$, and $Mn_3O_4$), copper oxides ($CuO$ and $Cu_2O$), vanadium pentoxide ($V_2O_5$), zirconium oxide ($ZrO_2$), iron oxides ($FeO$, $Fe_2O_3$, and $Fe_3O_4$), titanium dioxide ($TiO_2$) and zeolites, both natural and synthetic and activated carbon. The co-particle can be acid-enhanced or non-acid enhanced. In a preferred embodiment, the co-particle is not initially acid-enhanced although it may be contacted with acid during the binding step.

In a preferred embodiment, the composition comprises aluminum oxide made by the acid enhanced process of the invention, copper oxide, and manganese oxide. Preferably, these components are in a proportion of from 50–98 parts by weight, more preferably 80–95 parts by weight, even more preferably 88 parts by weight acid enhanced aluminum oxide; and 1–49 parts by weight, more preferably 4–19 parts by weight, even more preferably 6 parts by weight of each of copper oxide and manganese oxide. Preferably, the copper oxide is $CuO$ and the manganese oxide is $MnO_2$. Preferably, the composition is held together using a colloidal alumina binder that has been crosslinked as described below. In a preferred embodiment, this composition can be used to remediate organics, including but not limited to hydrocarbons and chlorinated organics, even more preferably, trichloroethylene (TCE).

Not wishing to be bound by theory, it is believed that at least some and possibly all of the ability of the acid-enhanced aluminum oxide/co-particle embodiment of the invention described above to remediate organic contaminants is due to a catalytic degradation of the organic contaminant, even at room temperature. This catalytic activity is evident because the inventive co-particle of Example 5 was challenged with a high concentration of organic contaminants and no organic contaminants were found the residual solution after TCLP analysis (see Example 6). In a preferred embodiment, the acid-enhanced $Al_2O_3$ in combination with one or more oxides of manganese, copper, and/or iron is particularly suited to catalytically degrade organics, such as hydrocarbons, chlorinated hydrocarbons and chlorinated organics, such as trichloroethylene. Even more preferably, the catalytic composition comprises 50–98 parts by weight, more preferably 80–95 parts by weight, even more preferably 88 parts by weight acid enhanced aluminum oxide; and 149 parts by weight, more preferably 4–19 parts by weight, even more preferably 6 parts by weight of each of copper oxide and manganese oxide.

Binders for binding the individual particles to form an agglomerated particle are known in the art or are described herein. In a preferred embodiment, the binder can also act as an adsorbent and/or a catalyst. Preferred binders are disclosed in applicants' application filed on the same date as this application entitled "Adsorbent and/or Catalyst and Binder System and Method of Making and Using Therefor," the disclosure of which is is herein incorporated by this reference in its entirety for all of its teachings.

A preferred binder for the agglomerated particle is colloidal alumina or colloidal silica. The colloidal alumina goes through a transformation stage and cross-links with itself from 25° C. to 400° C., preferably 250° C. and/or can cross-link with the particle. Colloidal silica cross-links with itself if it is sufficiently dried to remove water typically at temperatures of from 25° C. to 400° C. Preferably, from about 1 to 99.9 by weight, 20% to 99% or 10 to 35% by weight of the total mixture is colloidal alumina or colloidal silica to provide the necessary crosslinking during heating to bind the agglomerated particle into a water-resistant particle. The particle can then withstand exposure to all types of water for an extended time and not disintegrate.

The binder can be mixed with the particle before or after the acid treatment of this inventiont. In one embodiment, the agglomerated particle is made by mixing colloidal alumina with the adsorbent particles. Typically, from about 1 to about 99.9% by weight, 10 to 35% by weight, or from 20 to 99% by weight of the mixture is colloidal alumina. The particle mixture is then mixed with an acid solution such as, for example, nitric, sulfuric, hydrochloric, boric, acetic, formic, phosphoric, and mixtures thereof. In one embodiment the acid is 5% nitric acid solution. The colloidal alumina and adsorbent and/or catalytic particles are thoroughly mixed so as to create a homogenous blend of all elements. The additional acid solution is added and further mixing is performed until the mixture reaches a suitable consistency for agglomeration. After agglomeration is complete, the agglomerated particles are heated or dehydrated to cause the colloidal alumina crosslinking to occur.

The particle of this invention bonds with the contaminant so that the particle and contaminant are tightly bound. This bonding makes it difficult to remove the contaminant from the particle, allowing the waste to be disposed of into any public landfill. Measurements of contaminants adsorbed on the particles of this invention using an EPA Toxicity Characteristic Leachability Procedure (TCLP) test known to those of skill in the art showed that there was a very strong interaction between the particles of this invention and the contaminants such that the contaminant is held very tightly.

A preferred binder that can be used with the particles of this invention is a colloidal metal oxide or colloidal metalloid oxide binder as dislcosed in applicants copending application filed on the same date as this application and entitled "Adsorbent and/or Catalyst and Binder System and Method of Making and Using Therefor," which is (1) a continuation-in-part of PCT/US96/05303, filed Apr. 17, 1996, pending, which is a continuation-in-part of U.S. application Ser. No. 08/426,981, filed Apr. 21, 1995, abandoned; (2) a continuation-in-part of U.S. application Ser. No. 08/426,981, filed Apr. 21, 1995, pending; (3) a continuation-in-part of U.S. application Ser. No. 08/662,331, filed Jun. 12, 1996, abandoned, which is a continuation-in-part of PCT/US95/15829, filed Jun. 12, 1995, pending, which is a continuation-in-part of U.S. application Ser. No. 08/351,600, filed Dec. 7, 1994, abandoned; and (4) a continuation-in-part of PCT/US95/15829, filed Jun. 12, 1995, pending, which is a continuation-in-part of U.S. application Ser. No. 08/351,600, filed Dec. 7, 1994, abandoned. All of the above applications are hereby incorporated by this reference in their entireties for all of their teachings. Additionally, this binder can be used with an untreated (non-acid enhanced) particle of this invention and/or a treated particle of this invention. This binder can be used on any of the particle compositions referred to above or below of this invention, whether acid enhanced or not.

These various embodiments of the invention are described in the copending application filed on even date as follows.

In accordance with the purpose(s) of this invention, as embodied and broadly described herein, this invention, in one aspect, relates to a method for producing an adsorbent and/or catalyst and binder system comprising
i) mixing components comprising
   a) a binder comprising a colloidal metal oxide or colloidal metalloid oxide,
   b) an oxide adsorbent and/or catalyst particle, and
   c) an acid,
ii) removing a sufficient amount of water from the mixture to cross-link components a and b to form an adsorbent and/or catalyst and binder system.

In another aspect, the invention provides for an adsorbent and/or catalyst system made by the processes of the invention.

In one aspect, the invention provides an adsorbent and/or catalyst and binder system comprising a binder that has been cross-linked with at least one type of oxide adsorbent and/or catalyst particle.

In yet another aspect, the invention provides a method for reducing or eliminating the amount of a contaminant from a liquid or gas stream comprising contacting the adsorbent and/or catalyst binder system with the contaminant in the stream for a sufficient time to reduce or eliminate the amount of contaminant from the stream.

In yet another aspect, the invention provides a method for catalyzing the degradation of an organic compound comprising contacting the organic compound with the adsorbent and/or catalyst system for a sufficient time to catalyze the degradation of an organic compound.

In yet another aspect, the invention provides a method for reducing or eliminating the amount of a contaminant from a gas stream by catalysis comprising contacting the adsorbent and/or catalyst binder system with a gas stream containing a contaminant comprising an oxide of nitrogen, an oxide of sulfur, carbon monoxide, hydrogen sulfide, or mixtures thereof for a sufficient time to reduce or eliminate the contaminant amount.

In yet another aspect, the invention provides a method for producing an adsorbent and/or catalyst and binder system comprising
i) mixing components comprising
   a) a binder comprising a colloidal metal oxide or colloidal metalloid oxide,
   b) a first adsorbent and/or catalyst particle that does not cross-link with the binder, and
   c) an acid,
ii) removing a sufficient amount of water from the mixture to cross-link component a to itself, thereby entrapping and holding component b within the cross-linked binder, to form an adsorbent and/or catalyst and binder system.

In another aspect the invention relates to a composition for binding adsorbent and/or catalytic particles to produce an agglomerated particle comprising (a) a colloidal metal oxide or colloidal metalloid oxide and (b) an acid.

In another aspect the invention relates to a kit for binding adsorbent and/or catalytic particles to produce an agglomerated particle comprising (a) a colloidal metal oxide or colloidal metalloid oxide and (b) an acid.

In yet another aspect, the invention provides a method for binding adsorbent and/or catalytic particles, comprising the steps of:
(a) mixing colloidal alumina or colloidal silica with the particles and an acid;
(b) agitating the mixture to homogeneity; and
(c) heating the mixture for a sufficient time to cause cross-linking of the aluminum oxide in the mixture.

When the system acts as an adsorbent, the adsorbent and binder system of this invention has improved or enhanced adsorptive features. In one embodiment, the system of this invention can adsorb a larger amount of adsorbate per unit volume or weight of adsorbent particles than a prior art system. In another embodiment, the adsorbent and binder system of this invention can reduce the concentration of contaminants or adsorbate material in a stream to a lower absolute value than is possible with a non-bound or prior art-bound particle. In particular embodiments, the adsorbent and binder system of this invention can reduce the contaminant concentration in a stream to below detectable levels. Adsorption is a term well known in the art and should be distinguished from absorption. The adsorbent particles of this invention chemically bond to and very tightly retain the adsorbate material. These chemical bonds are ionic and/or covalent in nature.

The catalyst and binder system of the invention can also be used for the catalytic decomposition or remediation of contaminants. The catalyst system achieves improved catalytic performance or catalytic properties never seen before for a particular contaminant. The adsorbent and/or catalyst and binder system can be prepared by techniques set forth below to form a multifunctional composite particle. The catalysis can be at room temperature for certain applications.

The binder comprises an oxide particle that can react, preferably cross-link, with the other oxide complexes. This binder can also react, preferably cross-link, with itself. The binder forms cross-links with other oxide complexes upon drying by forming chemical bonds with itself and with other oxides. Under acidic conditions, the binder has a large number of surface hydroxyl groups. In one embodiment, the binder, which is designated as B—OH, cross-links with itself upon the loss of water to generate B—O—B. In addition cross-linking with itself, the binder B—OH can also cross-link with an adsorbent and/or catalyst oxide complex (M—O) or hydroxyl complex (M—OH) to produce B—O—M. The resulting binder system consists of a three dimensional network or matrix wherein the component particles are bound together with B—O—B and B—O—M bonds. The resulting system can be used as an adsorbent and/or catalyst system. The resultant system is sometimes referred to as an agglomerated particle.

"Colloidal metal or metalloid oxide (i.e. colloidal metal oxide or colloidal metalloid oxide) binder" as defined herein means a particle comprising a metal or metalloid mixed hydroxide, hydroxide oxide or oxide particle, such that the weight loss from the colloidal metal or metalloid oxide binder due to loss of water upon ignition is from 1 to 100%, 5 to 99%, 10 to 98%, or 50 to 95% of the theoretical water weight loss on going from the pure metal or metalloid hydroxide to the corresponding pure metal or metalloid oxide. The loss of water on going from the pure metal or metalloid hydroxide to the corresponding pure metal or metalloid oxide (e.g. the conversion of n $M(OH)_k$ to $M_nO_m$ and y $H_2O$ or more specifically from 2 $Al(OH)_3$ to $Al_2O_3$ and 3 $H_2O$) is defined as 100% of the water weight loss. Thus, the weight loss refers to loss of water based on the initial weight of water (not the total initial binder weight). There is a continuum of metal or metalloid hydroxides, hydroxide oxides, and oxides in a typical commercial product, such that, loss or removal of water from the metal or metalloid hydroxides produces the corresponding hydroxide oxides which upon further loss or removal of water give the corresponding metal or metalloid oxides. Through this continuum the loss or removal of water produces M—O—M bonds, where M is a metal or metalloid. The particles of this continuum, except for the pure metal or metalloid oxides, are suitable to serve as colloidal metal or colloidal oxide binders in this invention.

In another embodiment, the binder system involves the use of a binder in combination with a particle with few or no surface hydroxyl groups, such that the particle does not cross-link or only nominally cross-links with the binder. Examples of particles that posses only nominal amounts or that do not posses surface hydroxyl groups include particles of metals, such as, but not limited to tin or zinc, or carbon. In another embodiment, component b does not contain an oxide particle. Metal alloys such as bronze can also be used. In a preferred embodiment, the particle is activated carbon. In this embodiment, the binder cross-links with itself in a manner described above to form a three dimensional network or matrix that physically entraps or holds component b without cross-linking or cross-linking only to a very small degree with component b. The resulting binder system can be used as an adsorbent and/or catalyst system.

In another embodiment, the invention is directed to a method for producing an adsorbent and/or catalyst and binder system comprising
i) mixing components comprising
   a) a binder comprising a colloidal metal oxide or colloidal metalloid oxide,
   b) a first adsorbent and/or catalyst particle that does not cross-link with the binder, and
   c) an acid,
ii) removing a sufficient amount of water from the mixture to cross-link component a to itself, thereby entrapping and holding component b within the cross-linked binder, to form an adsorbent and/or catalyst and binder system, further comprising a second adsorbent and/or catalyst particle that cross-links with the binder, thereby cross-linking the binder and the second particle and thereby entrapping and holding the first particle within the cross-linked binder and/or within the cross-linked binder and second particle. In this embodiment, the system comprises a binder and oxide adsorbent and/or catalyst particles that cross-links with the binder as well as particles that have a limited amount of surface hydroxyl groups, which do not cross-link with the binder. In this case, the binder cross links to itself and to the oxide complex particles, and the binder also forms a network or matrix around the particles that have a limited number of surface hydroxyl groups.

Binders that can be used in the present invention are colloidal metal or metalloid oxide complexes. Colloidal as used herein is defined as an oxide group that has a substantial number of hydroxyl groups that can form a dispersion in aqueous media. This is to be distinguished from the other use of the term colloid as used in regard to a size of less than 1 $\mu$m. The binders herein are typically small in size, e.g. less than 150 $\mu$m, but they do not have to be all less than 1 $\mu$m. Typically, the binder is un-calcined to maximize the hydroxyl group availability. Moreover, they must have a substantial number of hydroxyl groups that can form a dispersion in aqueous media, which is not always true of colloid particles merely defined as being less than 1 $\mu$m. Examples of binders include but are not limited to any metal or metalloid oxide complex that has a substantial number of hydroxyl groups that can form a dispersion in aqueous media. In one embodiment, the binder is colloidal alumina, colloidal silica, colloidal metal oxide where the metal is iron, or a mixture thereof, preferably colloidal alumina or colloidal silica. Colloidal alumina can be a powder, sol, gel or aqueous dispersion. Colloidal alumina may be further stabilized with an acid, preferably nitric acid, and even more preferably 3 to 4% nitric acid. In a preferred embodiment, the colloidal alumina is un-calcined with a sufficient number of hydroxyl groups such that the total particle weight loss (as distinguished from just water weight loss discussed above) upon ignition is between from 5% to 34%, more preferably from 20% to 31%. The colloidal alumina size is preferably from 5 nm to 400 $\mu$m, preferably at least 30 wt % is less than 25 $\mu$m and 95 wt % is less than 100 $\mu$m. The colloidal silica is preferably un-calcined with a sufficient number of hydroxyl groups such that the total particle weight loss upon ignition is between from 5% to 37%, more preferably from 20% to 31%. The colloidal silica size is preferably from 5 $\mu$m to 250 $\mu$m, preferably at least 30 wt % is less than 25 $\mu$m and 95 wt % is less than 100 $\mu$m. In one embodiment, the binder is from 1% to 99.9% by weight of the mixture, preferably from 10% to 35% by weight. As used herein, the binder will be referred to as "colloidal" to distinguish it from particle b, as the composition types can be the same, e.g. both can contain aluminum oxides.

Although prior art binders can be used in combination with the binder system of the present invention, these prior art binders lack certain advantages. In the present invention, the activity is not degraded when exposed to aqueous solutions. The system is also very durable and not subject to falling apart when exposed to a waste stream, unlike other prior art adsorbent and/or catalyst and binder systems, such as polyvinyl pyrolidone, starch, or cellulose.

The invention contemplates the use of any prior art oxide adsorbent and/or catalyst particle or composite particle of two or more types of particles and binder system, but replacing the prior art binder with the binder of the present invention. In one aspect, the invention provides an adsorbent and/or catalyst and binder system comprising a binder that has been cross-linked with at least one type of oxide adsorbent and/or catalyst particles. In one embodiment, component b comprises at least two different types of oxide adsorbent and/or catalyst particles, to form a cross-linking between the binder and both particles to thereby form a composite particle. In another embodiment, component b comprises at least three different types of adsorbent and/or catalyst particles. In a preferred embodiment, component b comprises an oxide particle, preferably a metal oxide particle, and even more preferably a non-ceramic, porous metal oxide particle. Examples of such particles include, but are not limited to, oxide complexes, such as transition metal oxides, lanthanide oxides, thorium oxide, as well as oxides of Group IIA (Mg, Ca, Sr, Ba), Group IIIA (B, Al, Ga, In, Tl), Group IVA (Si,Ge, Sn, Pb), and Group VA (As, Sb, Bi). In general, any oxide complex that is a basic anhydride is suitable for component b. In another embodiment, component b comprises an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite. Typically, any oxidation state of the oxide complexes may be useful for the present invention. The oxide can be a mixture of at least two metal oxide particles having the same metal with varying stoichiometry and oxidation states. In one embodiment, component b comprises $Al_2O_3$, $TiO_2$, $CuO$, $Cu_2O$, $V_2O_5$, $SiO_2$, $MnO_2$, $Mn_2O_3$, $Mn_3O_4$, $ZnO$, $WO_2$, $WO_3$, $Re_2O_7$, $As_2O_3$, $As_2O_5$, $MgO$, $ThO_2$, $Ag_2O$, $AgO$, $CdO$, $SnO_2$, $PbO$, $FeO$, $Fe_2O_3$, $Fe_3O_4$, $Ru_2O_3$, $RuO$, $OsO_4$, $Sb_2O_3$, $CoO$, $Co_2O_3$, $NiO$ or zeolite. In a further embodiment, component b further comprises a second type of adsorbent and/or catalyst particles of an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt or nickel or zeolite, activated carbon, including coal and coconut carbon, peat, zinc or tin. In another embodiment, component b further comprises a second type of adsorbent and/or catalyst particles of aluminum oxide, titanium dioxide, copper oxide, vanadium pentoxide, silicon dioxide, manganese dioxide, iron oxide, zinc oxide, zeolite, activated carbon, peat, zinc or tin particle. Typical zeolites used in the present invention include "Y" type, "beta" type, mordenite, and ZsM5. In a preferred embodiment, component b comprises non-amorphous, non-ceramic, crystalline, porous, calcined aluminum oxide that was produced by calcining the precursor to the calcined aluminum oxide at a particle temperature of from 400° C. to 700° C., preferably in the gamma, chi-rho, or eta form. The precursor to calcined aluminum oxide can include but is not limited to boehmite, bauxite, pseudo-boehmite, scale, $Al(OH)_3$ and alumina hydrates. In the case of other metal oxide complexes, these complexes can also be calcined or uncalcined.

The adsorbent and/or catalyst particles used in this invention can be unenhanced or enhanced by processes known in the art or described below. For example, the particles can be dried to be activated or can be of a composition or treated by ion or electron beam or acid activation or enhancement treatment processes disclosed in the prior filed parent applications of and in applicants' two copending applications filed on the same date as this application and entitled (1) "Enhanced Adsorbent and Room Temperature Catalyst Particle and Method of Making and Using Therefor," which is a continuation-in-part of PCT/US96/05303, filed Apr. 17, 1996, pending, which is a continuation-in-part of U.S. application Ser. No. 08/426,981, filed Apr. 21, 1995, pending, and (2) "Acid Contacted Enhanced Adsorbent Particle and Method of Making and Using Therefor," which is a continuation-in-part of U.S. application Ser. No. 08/662, 331, filed Jun. 12, 1996, pending, which is a continuation-in-part of PCT/US95/15829, filed Jun. 12, 1995, pending, which is a continuation-in-part of U.S. application Ser. No. 08/351,600, filed Dec. 7, 1994, abandoned, the disclosures of both applications filed on the same date as this application and all of their prior filed priority applications are herein incorporated by this reference in their entireties for all of their teachings, indirectly, but not limited to particle compositions and methods of treatment.

An acid is required to cross-link the binder with component b. The addition of an acid to the binder facilitates or enables the reaction between the binder and the oxide particle. A strong or dilute acid can be used. A dilute acid is preferred to minimize etching of certain particles. Typically the acid is diluted with water to prevent dissolution of the particle and for cost effectiveness. The acid treatment is preferably of a concentration (i.e. acid strength as measured by, e.g., normality or pH), acid type, temperature and length of time to cross-link the binder and component b.

In one embodiment, the acid comprises nitric acid, sulfuric acid, hydrochloric acid, boric acid, acetic acid, formic acid, phosphoric acid or mixtures thereof, preferably acetic acid or nitric acid. In another embodiment, the concentration of the acid is from 0.15N to 8.5N, preferably from 0.5N to 1.7N. The volume of dilute acid used must be high enough so that the adsorbent and/or catalyst particle of the present invention can be used as is or further processed, such as extruded or filter pressed.

In order to ensure efficient cross-linking between the binder and the oxide particle component, water is removed from the resulting binder system. This is typically performed by using a drying agent or heating the system. The cross-linking temperature as used herein is the temperature at which cross-linking between the binder and the oxide adsorbent and/or catalyst component b occurs at an acceptable rate or the temperature at which the binder reacts with itself at an acceptable rate. In one embodiment, the cross-linking temperature is from 25° C. to 400° C. Thus, in one embodiment, the cross-linking temperature for certain binders is at room temperature although the rate of cross-linking at this temperature is slow. In a various embodiments, the cross-linking temperature is from 50° C., 70° C., 110° C., or 150° C. to 200° C., 250° C., 300° C., or 350° C., preferably 150° C. to 300° C., even more preferably about 250° C. The cross-linking process can take place in open air, under an inert atmosphere or under reduced pressure. The cross-linking temperature can effect the activity of the adsorbent and/or catalyst and binder system. When cross-linking occurs in the open air, then the particle is more susceptible to oxidation as the cross-linking temperature is increased. Oxidation of the particle can ultimately reduce the activity of the particle.

Preferably, during or after step (i), the mixture of step (i) is not heated above the cross-linking temperature of the colloidal metal oxide or colloidal metalloid oxide. Preferably, during or after step (i), the mixture of step (i) is not heated to or above the calcining temperature of the colloidal metal oxide or colloidal metalloid oxide. Preferably, during or after step (i), the mixture of step (i) is not heated to or above the calcining temperature of the particle. In various embodiments, during or after step (i), the mixture of step (i) is not heated above 500° C., 450° C., 400° C., 350° C., 300° C., or 250° C., preferably not above 400° C. Cross-linking should be distinguished from calcining. Calcining typically involves heating a particle to remove any residual water that may be on the particle as well as change the lattice structure of the particle to form a crystalline particle. For example for producing a crystalline aluminum oxide particle, the calcining temperature is about 400° C. to about 700° C. Calcining also removes the hydroxyl groups on the binder that are required for cross-linking. Therefore, heating the system during or after step (i) above the cross-linking temperature into the particle or binder calcining temperature range or above is detrimental to the system. Thus, prior art systems, where mixtures of colloidal alumina and/or colloidal silica are (1) calcined or recalcined or (2) heated to form a refractory material are not a part of this invention.

In another aspect, the invention provides for an adsorbent and/or catalyst system made by the process of the invention.

The binder system of the invention is made in one embodiment by the following general process. The (1) binder and (2) adsorbent and/or catalyst particles are pre-mixed in dry form. The colloidal binder can be added or prepared in situ. For example, alum could be added as a dry powder and converted to colloidal alumina in situe. Other aluminum based compounds can be used for the in situ process, such as aluminum chloride, aluminum secondary butoxide, and the like. A solution of the acid is added to the mixture, and the mixture is stirred or agitated, typically from 1 minute to 2 hours, preferably from 10 minutes to 40 minutes, until the material has a homogeneous "clay" like texture. The mixture is then ready for cross-linking or can be first fed through an extruder and then cut or chopped into a final shape, preferably spheres, pellets or saddles, typically of a size from 0.2 mm to 3 mm, preferably 0.5 to 1.5 mm. After the final shape is made, the product is transferred to a drying oven where they are dried from 15 minutes to 4 hours, preferably from 30 minutes to 2 hours. Once the binder is added to the adsorbent and/or catalyst particles (component b), the mixture is not heated to calcine or recalcine the particle b or binder. Such calcining or recalcining would detrimentally change the surface characteristics of component b by closing up the micropores. Additionally, the particles of the invention are preferably not sintered, as this would detrimentally affect the micropores by closing up the micropores and would detrimentally decrease the pore volume and surface area. The particles and binder system are also not heated above the calcining temperature to form a refractory material. Any other process that would increase the size or eliminate micropores, enlarge the size of, create macropores at the expense of micropores or destroy macropores, or would decrease the surface area available for adsorption or catalysis should preferably be avoided.

The size and shape of the particles used in this invention prior to extruding can vary greatly depending on the end use. Typically, for adsorption or catalytic applications, a small particle size such as 5 $\mu$m or greater to about 250 $\mu$m are preferable because they provide a larger surface area than large particles.

In yet another aspect, the invention provides a method for reducing or eliminating the amount of a contaminant from a liquid or gas stream comprising contacting the adsorbent and/or catalyst binder system with the contaminant in the stream for a sufficient time to reduce or eliminate the amount of contaminant from the stream. In one embodiment, the stream is a liquid, preferably water. In another embodiment, the stream is a gas, preferably comprising air or natural gas.

The adsorbent and/or catalyst binder system of this invention can be used for environmental remediation applications. In this embodiment, contaminants from a liquid or gas stream can be reduced or eliminated by a catalysis reaction. In another embodiment, contaminants from a liquid or gas stream can be reduced or eliminated by an adsorption reaction. The particle can be used to remove contaminants, such as, but not limited to, heavy metals, organics, including hydrocarbons, chlorinated organics, including chlorinated hydrocarbons, inorganics, or mixtures thereof Specific examples of contaminants include, but are not limited to, acetone, ammonia, benzene, carbon monoxide, chlorine, hydrogen sulfide, trichloroethylene, 1,4-dioxane, ethanol, ethylene, formaldehyde, hydrogen cyanide, hydrogen sulfide, methanol, methyl ethyl ketone, methylene chloride, oxides of nitrogen such as nitrogen oxide, propylene, styrene, oxides of sulfur such as sulfur dioxide, toluene, vinyl chloride, arsenic, cadmium, chlorine, 1,2-dibromochloropropane (DBCP), iron, lead, phosphate, radon, selenium, or uranium. The adsorbent and/or catalyst binder system of this invention can remediate individual contaminants or multiple contaminants from a single source. This invention achieves improved efficiency by adsorbing a higher amount of contaminants and by reducing the contamination level to a much lower value than by non-enhanced particles.

In yet another aspect, the invention provides a method for catalyzing the degradation of an organic compound comprising contacting the organic compound with the adsorbent and/or catalyst system for a sufficient time to catalyze the degradation of an organic compound. In one embodiment, the catalysis reaction is at room temperature. In a one embodiment, the organic compound is a chlorinated organic compound, such as trichloroethylene (TCE). In one embodiment, the catalyst and binder system catalyzes the hydrolysis of the chlorinated organic compounds.

In yet another aspect, the invention provides a method for reducing or eliminating the amount of a contaminant from a gas stream by catalysis comprising contacting the adsorbent and/or catalyst binder system with a gas stream containing a contaminant comprising an oxide of nitrogen, an oxide of sulfur, carbon monoxide, hydrogen sulfide, or mixtures thereof for a sufficient time to reduce or eliminate the contaminant amount. In one embodiment, the catalysis reaction is at room temperature.

For environmental remediation applications, adsorbent and/or catalyst particles of the invention are typically placed in a container, such as a filtration unit. The contaminated stream enters the container at one end, contacts the particles within the container, and the purified stream exits through another end of the container. The particles contact the contaminants within the stream and bond to and remove the contamination from the stream. Typically, the particles become saturated with contaminants over a period of time, and the particles must be removed from the container and replaced with fresh particles. The contaminant stream can be a gas stream or liquid stream, such as an aqueous stream. The particles can be used to remediate, for example, waste water, production facility effluent, smoke stack gas, auto exhaust, drinking water, and the like.

The particle/binder system of the invention can be used preferably as the adsorbent or catalytic medium itself In an alternate embodiment, the system is used as an adsorbent or catalytic support.

When the particle adsorbs a contaminent, the particle of this invention bonds with the contaminant so that the particle and contaminant are tightly bound. This bonding makes it difficult to remove the contaminant from the particle, allowing the waste to be disposed of into any public landfill. Measurements of contaminants adsorbed on the particles of this invention using an EPA Toxicity Characteristic Leachability Procedure (TCLP) test known to those of skill in the art showed that there was a very strong interaction between the particles of this invention and the contaminants such that the contaminant is held very tightly.

Although the particle system bonds tightly to the contaminent, the system of the invention can be regenerated by various techniques, such as by roasting it in air to reoxidize the particles.

In one embodiment, component b comprises aluminum oxide, copper oxide, and manganese dioxide. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from 1 to 99.9 parts by weight, preferably from 55 to 85 parts by weight, the copper oxide is from 1 to 99.9 parts by weight, preferably from 1 to 20 parts by weight, and the manganese oxide is from 1 to 99.9 parts by weight, preferably from 1 to 20 parts by weight. In another embodiment, the binder is 20 parts by weight, aluminum oxide is 70 parts by weight, copper oxide is 5 parts by weight, and manganese dioxide is 5 parts by weight.

In another embodiment, component b comprises aluminum oxide and activated carbon. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from 1 to 99.9 parts by weight, preferably from 45 to 75 parts by weight, and the activated carbon is from 1 to 99.9 parts by weight, preferably from 35 to 55 parts by weight. In another embodiment, the binder is 20 parts by weight, aluminum oxide is 60 parts by weight, and activated carbon is 5 parts by weight.

In another embodiment, component b comprises copper oxide and manganese dioxide. In this embodiment, the binder is preferably colloidal alumina. In this embodiment, the acid is preferably acetic acid. In this embodiment, the binder is from 1 to 99.9 parts by weight, preferably from 5 to 35 parts by weight, the copper oxide is from 1 to 99.9 parts by weight, preferably from 35 to 55 parts by weight, and the manganese dioxide is from 1 to 99.9 parts by weight, preferably from 25 to 55 parts by weight. In another embodiment, the binder is 20 parts by weight, copper oxide is 40 parts by weight, and manganese dioxide is 40 parts by weight.

In another embodiment, component b comprises aluminum oxide, copper oxide, manganese dioxide and activated carbon. In this embodiment, the binder is preferably colloidal alumina. In this embodiment, the acid is preferably acetic acid. In this embodiment, the binder is from 1 to 99.9 parts by weight, preferably from 5 to 35 parts by weight, the aluminum oxide is from 1 to 99.9 parts by weight, preferably from 45 to 75 parts by weight, the copper oxide is from 1 to 99.9 parts by weight, preferably from 1 to 20 parts by weight, the manganese dioxide is from 1 to 99.9 parts by weight, preferably from 1 to 20 parts by weight, and activated carbon is from 1 to 99.9 parts by weight, preferably from 1 to 25 parts by weight. In another embodiment, the binder is 19.9 parts by weight, aluminum oxide is 60 parts by weight, copper oxide is 5.98 parts by weight, manganese dioxide is 4.98 parts by weight, and activated carbon is 9.95 parts by weight.

In another embodiment, the component b comprises aluminum oxide, silicon dioxide and activated carbon. In a further embodiment, the particle comprises 1–99 parts, preferably 5–35 parts, more preferably 20 parts by weight aluminum oxide, 1–99 parts, preferably 5–35 parts, more preferably 20 parts by weight silicon dioxide and 1–99 parts, preferably 25–55 parts, more preferably 40 parts by weight activated carbon. In this embodiment, the binder is preferably colloidal alumina and the acid is preferably acetic acid. The binder is from 1 to 99.9 parts by weight, preferably from 5 to 35 parts by weight.

In another embodiment, the catalyst and binder system can be used as an oxidation catalyst. In one embodiment, the system comprises colloidal alumina as a binder, $Al_2O_3$, and one or more of the following oxide particles of $V_2O_5$, $WO_2$, $WO_3$, $TiO_2$, $Re_2O_7$, $As_2O_3$, $As_2O_5$, $OsO_4$, or $Sb_2O_3$. In another embodiment, the colloidal alumina is from 10 to 30 parts by weight, $Al_2O_3$ is from 1 to 90 parts by weight, and $V_2O_5$, $WO_2$, $WO_3$, $TiO_2$, $Re_2O_7$, $As_2O_3$, $As_2O_5$, $OsO_4$, or $Sb_2O_3$ are each from 1 to 90 parts by weight.

In another embodiment, the catalyst and binder system can be used as a Lewis acid catalyst. In one embodiment, the system comprises colloidal alumina as a binder, $Al_2O_3$, and one or more of the following oxide particles of $V_2O_5$, $ZrO_2$, $TiO_2$, $MgO$, $ThO_2$ or lanthanide oxides. In another embodiment, the colloidal alumina is from 10 to 30 parts by weight, $Al_2O_3$ is from 1 to 90 parts by weight, and $V_2O_5$, $ZrO_2$, $TiO_2$, $MgO$, $ThO_2$ or lanthanide oxides are each from 1 to 90 parts by weight.

In another embodiment, the catalyst and binder system can be used as a cracking catalyst. In one embodiment, the system comprises colloidal alumina as a binder, $Al_2O_3$, and one or more of the following oxide particles of $CuO$, $ZnO$, $Ag_2O$, $AgO$, $CdO$, $SnO_2$, $PbO$, $V_2O_5$, $ZrO_2$, $MgO$, $ThO_2$ or lanthanide oxides. In another embodiment, the colloidal alumina is from 10 to 30 parts by weight, $Al_2O_3$ is from 1 to 90 parts by weight, and $CuO$, $ZnO$, $Ag_2O$, $AgO$, $CdO$, $SnO_2$, $PbO$, $V_2O_5$, $ZrO_2$, $MgO$, $ThO_2$ or lanthanide oxides are each from 1 to 90 parts by weight.

In another embodiment, the catalyst and binder system can be used as a reduction catalyst. In one embodiment, the system comprises colloidal alumina as a binder, $Al_2O_3$, and one or more of the following oxide particles of $MnO_2$, $Fe_2O_3$, $Fe_3O_4$, $Ru_2O_3$, $OsO_4$, $CoO$, $Co_2O_3$, $RuO$ or $NiO$. In another embodiment, the colloidal alumina is from 10 to 30 parts by weight, $Al_2O_3$ is from 1 to 90 parts by weight, and $MnO_2$, $Fe_2O_3$, $Fe_3O_4$, $Ru_2O_3$, $OsO_4$, $CoO$, $Co_2O_3$, $RuO$ or $NiO$ are each from 1 to 90 parts by weight.

In another embodiment, the catalyst and binder system can be used as a coal gasification catalyst. In one embodiment, the system comprises colloidal alumina as a binder, $Al_2O_3$, and one or more of the following oxide particles of $Fe_2O_3$, $Fe_3O_4$, $CoO$ or $Co_2O_3$. In another embodiment, the colloidal alumina is from 10 to 30 parts by weight, $Al_2O_3$ is from 1 to 90 parts by weight, and $Fe_2O_3$, $Fe_3O_4$, $CoO$, or $Co_2O_3$, are each from 1 to 90 parts by weight.

In another embodiment, the catalyst and binder system can be used as a coal gas reforming catalyst. In one embodiment, the system comprises colloidal alumina as a binder, $Al_2O_3$, and one or more of the following oxide particles of $Fe_2O_3$, $Fe_3O_4$, $CoO$ or $Co_2O_3$. In another embodiment, the colloidal alumina is from 10 to 30 parts by weight, $Al_2O_3$ is from 1 to 90 parts by weight, and $Fe_2O_3$, $Fe_3O_4$, $CoO$, or $Co_2O_3$, are each from 1 to 90 parts by weight.

In another embodiment, the catalyst and binder system can be used as a hydrogenation catalyst. In one embodiment, the system comprises colloidal alumina as a binder, $Al_2O_3$, and one or more of the following oxide particles of $Fe_2O_3$, $Fe_3O_4$, CoO or $Co_2O_3$. In another embodiment, the colloidal alumina is from 10 to 30 parts by weight, $Al_2O_3$ is from 1 to 90 parts by weight, and $Fe_2O_3$, $Fe_3O_4$, CoO or $Co_2O_3$ are each from 1 to 90 parts by weight.

In another embodiment, the catalyst and binder system can be used as a desiccant. In one embodiment, the system comprises colloidal alumina as a binder, $Al_2O_3$, and one or more of the following oxide of zeolite, MgO, or $ThO_2$. In another embodiment, the colloidal alumina is from 10 to 30 parts by weight, $Al_2O_3$ is from 1 to 90 parts by weight, and zeolite, MgO, or $ThO_2$ are each from 1 to 90 parts by weight.

In another embodiment, the catalyst and binder system can be used as a catalyst support. In one embodiment, the system comprises colloidal alumina as a binder, $Al_2O_3$, and one or more of the following oxide particles of MgO or $ThO_2$. In another embodiment, the colloidal alumina is from 10 to 30 parts by weight, $Al_2O_3$ is from 1 to 90 parts by weight, and MgO or $ThO_2$ are each from 1 to 90 parts by weight.

In another embodiment, the invention relates to a composition for binding adsorbent and/or catalytic particles to produce an agglomerated particle comprising (a) a colloidal metal oxide or colloidal metalloid oxide and (b) an acid. In this composition, in one embodiment, the colloidal metal oxide or colloidal metalloid oxide comprises colloidal alumina or colloidal silica. In this composition, in one embodiment, the acid is acetic acid or nitric acid.

In another embodiment, the invention relates to a method for binding adsorbent and/or catalytic particles, comprising the steps of:

(a) mixing colloidal alumina or colloidal silica with the particles and an acid;

(b) agitating the mixture to homogeneity; and (c) heating the mixture for a sufficient time to cause cross-linking of the aluminum oxide in the mixture.

In one embodiment, the colloidal alumina or colloidal silica is colloidal alumina. In another embodiment, the colloidal alumina is from 20% to 99% by weight of the mixture. In another embodiment, the acid is nitric acid.

EXPERIMENTAL

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature and pressure is at or near atmospheric.

EXAMPLE 1

Enhanced aluminum oxide was made by the process of this invention using the following steps:

i) Gamma aluminum oxide particles were produced by calcining $Al(OH)_3$ at a temperature of 550–560° C. to produce calcined $Al_2O_3$ of the gamma form.

ii) 20 liters of this aluminum oxide were submerged in a tank containing 0.5% by weight acetic acid in distilled water. The total volume of solution was 98.7 liters. The alumina was allowed to sit in the acid solution for approximately 15 minutes to allow saturation of the solution. The acid solution was drained off and the remaining alumina was rinsed in a tank of 30 liters of distilled water. The distilled water was drained and the remaining alumina was dried at a temperature of 121° C. for 90 minutes.

The performance of enhanced aluminum oxide particles of this invention was tested. Two chromatographic columns, each 25 cm. long and 1 cm. inner diameter, equipped with a solvent reservoir were used for this experiment. Each column was packed with 20 cc of the above produced enhanced aluminum oxide particles. Each column was flushed with 100 ml of water using pressure from the nitrogen cylinder to obtain a flow rate of approximately 20 ml per minute. A test solution of approximately 200 ppb of lead was prepared using lead acetate trihydrate. A total of 200 ml (10 bed volumes) of test solution was passed through each column using the same flow rate. The influent, the total effluent from the 10 bed volumes, and the effluent sample collected during the tenth bed volume were analyzed for lead, and the results are summarized in Table 1.

TABLE 1

| TEST NUMBER | STREAM TESTED | TOTAL LEAD* ($\mu$gm/liter) |
| --- | --- | --- |
| 1 | Influent | 211 |
|   | Total effluent | <5 |
|   | Effluent end (10th bed volume) | <5 |
| 2 | Influent | 229 |
|   | Total effluent | <5 |
|   | Effluent end (10th bed volume) | <5 |

*Lower limit of lead detection was 5 $\mu$gm/liter.

This particle was also tested using the TCLP method (EPA method #6010), and the particle of the invention passed the TCLP test for lead.

EXAMPLE 2

A comparison was made between acid enhanced alumina of this invention and non-acid-treated alumina for removing lead. Both aluminum oxide particles were calcined at 550° C. prior to the experiment. Enhanced gamma aluminum oxide particles of the present invention were made according to the procedures of Example 1. Two identical five gallon containers were filled with the alumina oxide for lead removal. One container was filled with 16 liters of the treated alumina of this invention. The other was filled with 16 liters of untreated alumina. Two tanks were prepared each containing 100 gallons of lead acetate tri-hydrate spiked distilled water. The tanks were mixed thoroughly for 30 minutes. After 30 minutes of mixing, the concentrations of the lead in the water were determined. The lead containing water from each tank was passed through the containers of alumina. A total of 80 gallons of spiked water (19 bed volumes) were passed through each of the containers at a flow rate of 62 gallons per minute. An effluent water sample was taken on the 19the bed volume and was analyzed for total lead. The percent reductions were then calculated. The results of the tests are set forth in Table 2 below.

TABLE 2

| PARTICLE Calcined @ 550° C. before acid treated | INITIAL LEAD CONCEN- TRATION (mg/l) | EFFLUENT CONCENTRATION AFTER CONTACTING PARTICLE (mg/l) | PERCENT RE- DUCTION OF LEAD (%) |
|---|---|---|---|
| Non-acid-treated aluminum oxide | 1.24 | 0.58 | 53 |
| Acid treated aluminum oxide of the invention | 1.44 | 0.39 | 73 |

EXAMPLE 3

A comparison was made between treated alumina of this invention and non-treated alumina for removing phosphate. Chi-rho aluminum oxide particles were produced by calcining $Al(OH)_3$ at a particle temperature of 480–520° C. Enhanced chi-rho aluminum oxide particles of the present invention were acid treated according to the procedure of step (ii) in Example 1. The performance of the particles was measured using the same procedures of Example 1, except that one chromatographic column was filled with 20 cc of the treated alumina and the other column was filled with 20 cc of the untreated alumina and the test solution was 9.3 mg/l of $KH_2PO_4$, and the results are summarized in Table 3.

TABLE 3

| PARTICLE Calcined @ 480° C. before acid treated | INITIAL PHOSPHATE CONCEN- TRATION (mg/l) | EFFLUENT CONCENTRA- TION AFTER CONTACTING PARTICLE (mg/l) | PERCENT REDUCTION OF PHOSPHATE (%) |
|---|---|---|---|
| Non-acid treated aluminum oxide | 9.3 | 0.16 | 98.3 |
| Acid reated aluminum oxide of the invention | 9.3 | 0.04 | 99.6 |

This particle of this invention from the experiment was also tested using the TCLP method (EPA method # 1311), and the particle of the invention passed the TCLP test for phosphate.

EXAMPLE 4

The ability of the particle of this invention to remove selenium was tested. Acid enhanced gamma aluminum oxide particles (100% $Al_2O_3$) were made by the procedure of Example 1.

5 columns were prepared using 0.875" I.D.×12" long glass columns, each with a bed volume of ~95 mls of the above acid enhanced $Al_2O_3$ particles of this invention of various particle sizes, ranging from 500 μm to 4,000 μm. Each bed was flushed with ~5 bed volumes of D.I. water by downward pumping at 5–6 gpm/ft² cross sectional flow rate (i.e., ~95 ml/min). A test solution was prepared with a calculated 1.5 mg/L selenium concentration. A total of ~10 bed volumes (i.e., ~1 L per column) test solution was pumped through each column using the same flow rate. During the test, the test solution was continuously stirred at a low speed. During the tenth bed volume, an effluent sample from each column was collected and analyzed for selenium. Also a single influent sample was collected and analyzed for selenium. The results are set forth below.

TABLE 4

| Sample I.D. (particle size μm) | Total Selenium[a] mg/L |
|---|---|
| Influent | 1.45 |
| 606 EFF (4,000 μm) | 0.101 |
| 404 EFF (1,000 μm) | 0.073 |
| 303 EFF (2,000 μm) | 0.477 |
| 202 EFF (500 μm) | 0.003[b] |
| 101 EFF (3,300 μm) | 0.121 |

[a] = Selenium detection limit was 0.002 mg/l
[b] = Estimated value, less than calibration limit

EXAMPLE 5

A combination particle of this invention was made and tested for its ability to remove trichloroethylene (TCE). 70 g of acid enhanced gamma aluminum oxide particles made by the procedure of Example 1 were mixed with 20 g of colloidal alumina, 5 g of $MnO_2$, and 5 g of CuO until the mixture was homogeneous. The particle mixture was then mixed with 5% acetic acid solution until the mixture reached a suitable consistency for agglomeration. The mixture was extruded and cut into a particle size of about 1,000 μm and heated to 150° C. for 15 minutes to crosslink the colloidal alumina.

The particle as formed above was tested for its ability to remove TCE from water. Particles of the invention were challenged with various concentrations of TCE in water as indicated in Table 1. Two custom made columns (40 cm×20 mm) equipped with coarse glass frits were dried packed with 10 mL volumes (measured with a 10 mL graduated cylinder) of particles. The columns were challenged with five 10 mL aliquots (5 bed volumes) of the TCE solution. The fifth bed volume from each column was collected in a 50 mL Erlenmeyer flask, stoppered, and immediately analyzed by purge and trap-GC/MS technique using a Finnigan MAT Magnum ion trap GC/MS equipped with a Tekmar liquid sample concentrator (LSC 2000). The results are summarized in Table 5.

TABLE 5

| | Trichloroethylene concentration | |
|---|---|---|
| Sorbate | Influent (ppm) | Effluent (ppb) |
| TCE in water | 1.0 | <50 |

EXAMPLE 6

TCE adsorption and TCLP extraction procedures were performed as follows. A 20.0114-gram (about 24.50 mL bed volume) sample of the $Al_2O_3$/CuO/$MnO_2$ combination particle of Example 5 (designated as 0307595TCE1) after treatment with TCE was wet packed into a 50-mL buret (with removable stopcock) plugged with glass wool. The sample was charged with five bed volumes of water. The sorbent material was then quantitatively transferred into the Zero Headspace Extractor (ZHE) apparatus into which 200 mL of water was added, appropriately sealed and agitated for 18 hours. The filtered solution was collected in two 100 mL vials, stored in the refrigerator at 4° C. until analysis by GC/MS. The Finnigan MAT Magnum ion trap GC/MS equipped with a Tekmar liquid sample concentrator (LSC 2000) was used for analysis.

The calibration curve procedure was as follows. A freshly prepared 50 ppm TCE stock solution was obtained by dissolving 34.2 μl spectrophotometric grade TCE (Aldrich) in 20 ml HPLC grade methanol (Fisher) followed by dilution to a liter. Dilution of this solution (1000 μl:1L) resulted in a 50 ppb TCE stock solution. All dilutions were accomplished using deionized water. A calibration curve was constructed by purging 1.0, 0.50, 0.20, 0.10, and 0.050 ppb TCE solutions.

The results are set forth below.

TABLE 7

| ID # | Starting Material | Calcining Temp. (time) | Wash Treatment After heat treatment | Pore Area M²/gram | Median Pore Diameter (Vol) μm: | Median Pore Diameter (Area) μm: | Average Pore (4V/A) μm | Capacity $PO_4^{-3}$ g/Kg BULK |
|---|---|---|---|---|---|---|---|---|
| Pbhk (AU) | Beohmite | 400° C. (60 min) | 0.5% Acetic Acid 15 min | 23 | 102 | 0.0088 | 0.11 | 13.56 |
| Pohk (AT) | Beohmite | 475° C. (60 min) | 0.5% Acetic Acid 15 min | 14 | 90 | 0.0078 | 0.079 | 14.47 |
| Pblk (CU) | Scale Alumina (Bayerite) | 500° C. (60 min) | 0.5% Acetic Acid 15 min | 7 | 93 | 0.0146 | 0.2591 | 11.56 |
| Polk (CT) | Scale Alumina (Bayerite) | 550° C. (60 min) | 0.5% Acetic Acid 15 min | 6.3 | 69 | 0.075 | 0.12 | 10.93 |

TABLE 6

| Sorbent Sample | TCE found, ppb | TCE Detection limit, ppb |
|---|---|---|
| 0307595TCE1 | Nd[a] | 0.0050 |

[a]= Not detected. The fact that TCE in the sample is less that 500 ppb (EPA TCLP limit) characterizes it as a nonhazardous waste with respect to TCE.

EXAMPLE 7

A 100 ml. portion of 1000 ppm phosphorous (potassium hydrogen phosphate and water) standard (Lab Chem, Inc.) was diluted to 2 litres. Aliquots (200 ml) of the resulting stock solution containing 50 ppm phosphorous were tumbled for 24 h with duplicate approximately 2 ml (dry) volumes (both volumes and mass measured) of each alumina sample, and centrifuged. Acid enhanced gamma alumina oxide particles of samples Pblk (CU), and Polk (CT) and acid enhanced chi-rho alumina oxide particles Pbhk (AU) and Pohk (At) were made by procedures of Example 1 except that the starting alumina "type" is different as shown in Table 7, and that the calcining temperatures were different for the four samples as shown in Table 7 below. These materials were challenged to determine the capacity of the alumina to remove phosphate ($PO_4^{-3}$) given the variables in starting materials and treatment. Aliquots (0.4 ml) of the supernatant were diluted to 20 ml. To each of these solutions was added, with shaking, 2 drops phenolphthalein (Fisher), followed by 1 ml of ammonium molybdate reagent I and then 2 stops of stannous chloride reagent I (LabChem Inc.). Determination of aqueous phosphate was achieved by the measurement of color, photometrically at 690 nm (path length, 0.5 cm) in a quartz cell and read in a Shimadzu UV-2101PC, UV/VIS scanning spectrophotometer. All dilutions were accomplished using deionized water. The results are set forth below

EXAMPLE 8

Acid enhanced gamma alumina oxide particles of samples Pbhk (AU), Pohk (At), Pblk(CU), and Polk(CU) were made by procedures of Example 7. These materials were challenged to determine the capacity of the alumina to remove lead ($Pb^{++}$) given the variables in starting materials and treatment. A 500 ml portion of 400 ppm of lead (0.6392 g $Pb(NO_3)_2$ dissolved in 10 ml concentrated nitric acid and diluted to one liter with deionized water) was diluted to two liters with deionized water. Aliquots (450 ml) of the resulting stock solution containing 50 ppm Pb, were tumbled for 24 h with approximately 2 ml (dry) volumes (both volume and mass measured) of each alumina sample, centrifuged, and stored prior to GFAA analysis. The instrument used was a Shimadzu AA-6501F atomic absorption spectrophotometer. The results are shown below.

TABLE 8

| ID # | Capacity $Pb^{++}$, g/Kg BULK |
|---|---|
| Pbhk (AU) | 1.9 |
| Pohk (AT) | 1.7 |
| Pblk (CU) | 3.0 |
| Polk (CT) | 1.3 |

EXAMPLE 9

Acid enhanced gamma alumina oxide particles of samples Pbhk (AU), Pohk (AT), Pblk(CU), and Polk (CT) were made by procedures of Example 7. These materials were challenged to determine the capacity of the alumina to remove arsenic($AsO_3^{-2}$) given the variables in starting materials and treatment. A 200 ml portion of 1000 ppm of arsenic (arsenic trioxide in 10% nitric acid) standard (Fisher SA449–500)

diluted to 4 liters with deionized water was used. Aliquots (450 ml) of the resulting stock solution containing 50 ppm As, were tumbled for 24 h with duplicate approximately 2 ml (dry) volumes (both volume and mass measured) of each alumina sample, centrifuged, and stored prior to GFAA analysis. The instrument used was a Shimadzu AA-6501F atomic absorption spectrophotometer. The results are shown below.

TABLE 9

| ID # | Capacity As as $AsO_3^{-2}$ g/Kg, BULK |
|---|---|
| Pbhk (AU) | 11.9 |
| Pohk (AT) | 10.6 |
| Pblk (CU) | 8.9 |
| Polk (CT) | 8.1 |

EXAMPLE 10

In a large scale test a 2,300 gallon tank was filled with approximately 2,000 gallons of tap water and 147.8 g of $Pb(OAc)_2 \cdot 3H_2O$ was added, the pH was adjusted to 6.7, and the tank was sampled and found to be 8,750 ppb in $Pb^{++}$. A canister was filled with 19.6 Kg of Polk (CT) as described in Example 7. The lead spiked water from the tank was pumped through the canister at a rate of 1.5 gallons per min. to remove the lead. Samples of the effluent were collected after each 250 gallons and the lead concentration was determined and plotted as shown in FIG. 1. The tank was refilled with another approximately 2,000 gallons of tap water and 147.8 g of $Pb(OAc)_2 \cdot 3H_2O$ was added to give a 9,160 ppb solution. The pH was adjusted to 7.00 and the spiked solution was pumped through the same canister at a flow rate at 1.5 gallons per min. Samples of the effluent were collected after each 250 gallons and the lead concentration was determined and plotted as shown in FIG. 1. Samples lead concentration for samples obtained at 2,000–3,500 were found to be below the detection limit of 0.2 ppb. The lead removal capacity of Polk (CT) was determined in this test to be 6 g/Kg.

EXAMPLE 11

Various adsorbent and/or catalytic binder systems as set forth in Table 10 in Example 12 below were made in accordance with the general procedures of this invention as follows as well as various systems not a part of the invention.

The binder and adsorbent and/or catalytic particles were combined into a mixing vessel, the amount of each varied according to the size batch desired. However, the component ratios remained constant as indicated in Table 10 below. This "dry" combination was pre-mixed to ensure a homogenous mixture of all of the components. After this was accomplished, a solution containing 5% acetic acid in distilled water was added to the mixture. The amount of the acid compared to the other components varied depending on extruding parameters and other processing variables, but for the procedures herein the range was typically between 35 and 45 wt. % of the total mixture.

This solution was added to the dry materials and mixed until the material had a homogenous "modeling clay" like consistency. The mixing was performed utilizing a Hobart "A-300" mixer. The material was then ready for extrusion. The mixed product containing the acetic acid solution was fed through an extruder, such as a DGL-1 dome granulator manufactured by LCI Corporation of Charlotte, N.C., U.S.A. The extrudates were fed through a QJ-230 marumarizer, also manufactured by LCI Corporation, which turned the extrudates as "Rods" into small spheres. The extruding and marumarizing steps provided a finished product suitable to use for a specific application. However, the marumarizing is optional and does not alter the performance of the product. After the spheres were made, the product was transferred to a drying oven where it was dried for one (1) hour at a temperature of 250° Celsius. The product was then ready for use in an application.

EXAMPLE 12

The particles as formed of the constituents listed below in Table 10 were tested for their ability to remove TCE. Adsorbent and/or catalyst and binder systems of Table 10 were challenged with various concentrations of TCE as indicated in Table 10. Two custom made columns (40 cm×20 mm) equipped with coarse glass frits were dried packed with 10 mL volumes (measured with a 10 mL graduated cylinder) of particles. The columns were challenged with five 10 mL aliquots (5 bed volumes) of the trichloroethylene (TCE) solution. The fifth bed volume from each column was collected in a 50 mL Erlenmeyer flask, stoppered, and immediately analyzed by purge and trap-GC/MS technique using a Finnigan MAT Magnum ion trap GC/MS equipped with a Tekmar liquid sample concentrator (LSC 2000).

The particles in Table 10 were prepared as described in Example 11. The percent composition of each component as well as the nature of the binder are presented in Table 10. Prior to mixing with the other components, the aluminum oxide particle was first calcined at 500° C. or 550° C. as indicated in Table 10, then acid treated by substantially contacting with 0.5% acetic acid at room temperature for 15 minutes as generally set forth in applicants' copending application filed on even date entitled "Acid Contacted Enhanced Adsorbent Particle and Method of making and Using Therefor" and as set forth in the parent applications to that application as listed above, and then dried at 121° C. for 90 minutes.

The removal of TCE from aqueous solution was investigated using a number of adsorbent and/or catalyst and binder systems of the present invention, and these results are summarized in Table 10. In Entry 8, 99% reduction of TCE was observed when the particle consisted of 40% CuO, 40% $MnO_2$, and 20% colloidal alumina as the binder. When no binder was used, however, the $CuO/MnO_2$ particle removed only 0–1% of TCE (Entries 9A 9B). These results indicate the necessity of the binder material to enhance or provide adsorbent and/or catalytic properties of or to the particle. Other particles demonstrated the ability to remove TCE. For example, entry 1 removed>95% of TCE. Entry 7 removed 99% of TCE. The particle of entry 7 had two adsorbent and/or catalyst particles, one of which was carbon. Carbon was also used in conjunction with multiple metal oxide components (Entry 24A and B) to remove TCE (>90%).

Although Entry 3 removed 96% of TCE, the PVP binder does not hold the particle together as long as the binders of the present invention. Particles with the PVP binder disintegrated over time, which reduced the usefulness of the particle. In the case of Entries 5A, 5B and 6, TCE removal was very high (98%); however, the activated peat also breaks apart much faster than the particles of the present invention. The contaminents adsorbed by the peat may also leach into the environment.

Not wishing to be bound by theory, two plausible mechanisms can account for the catalytic degradation of TCE using the particles of the present invention. The first mechanism involves redox chemistry between TCE and the metal oxide components of the particle. TCE is electrophilic, and can stabilize a negative charge if reduced. Electron transfer from a metal oxide component to TCE may be the first step toward the degradation of TCE. A second mechanism involves a Lewis acid-base interaction between TCE and the metal oxide component, which increases the rate of nucleophilic attack of TCE by water. Due to the lone pair electrons on the chlorine groups of TCE, a metal oxide component can initially coordinate to the chlorine group. This initial coordination may also be the first step toward the catalytic degradation of TCE.

TABLE 10

| Entry | Binder (Wt %) | Drying/ Crosslinking temperature ° C. (time min) | $Al_2O_3$ wt % (Calcining temperature, ° C.), Acid treated | CuO (Wt %) | $MnO_2$ (Wt %) | Other Component(s) (wt %) |
|---|---|---|---|---|---|---|
| 1 | V-900 (20) | 150 (15) | 70 (550) | 5 | 5 | |
| 2 | PVP (3.2) | 150 (30) | 91.3 (550) | 2.5 | 2.5 | MethylCellulose (0.5) |
| 3 | PVP (3.2) | 150 (30) | 91.3 (550) | 2.5 | 2.5 | MethylCellulose (0.5) |
| 4 | | NA | | | | Zeolite (100) |
| 5 | | NA | | | | Acid treated Peat (100) |
| 6 | | NA | | | | Acid treated Peat (100) |
| 7 | V-900 (20) | 250 (60) | 40 (500) | | | WPH Carbon (40) |
| 8 | V-900 (20) | 250 (60) | | 40 | 40 | |
| 9 | | 250 (60) | | 50 | 50 | |
| 10 | V-900 (20) | 250 (60) | 60 (500) | 10 | 10 | |
| 11 | V-900 (20) | 250 (60) | 70 (500) | 5 | 5 | |
| 12 | V-900 (20) | 250 (60) | | 10 | 10 | Zeolite (60) |
| 13 | | 250 (60) | 100 (550) | | | |
| 14 | V-900 (20) PVP (3) | 250 (60) | 67 (550) | 5 | 5 | |
| 15 | V-900 (20) PVP (3) | 250 (60) | 71.6 (550) | 2.5 | 2.5 | MethylCellulose (0.4) |
| 16 | V-900 (17) | 250 (60) | 13.6 (550) | 1.7 | 1.7 | Tin (66) |
| 17 | V-900 (13.6) | 250 (60) | 17 (550) | 1.7 | 1.7 | Zinc (66) |
| 18 | V-900 (13.6) | 250 (60) | 17 (550) | 1.7 | 1.7 | |
| 19 | V-900 (20) | 250 (60) | 17 (550) | 1.7 | 1.7 | Tin (66) |
| 20 | V-900, (20) | 250 (60) | 17 (550) | 1.7 | 1.7 | Zinc (66) |
| 21 | V-900 (20) | 250 (60) | 70 (550) | 5 | 5 | |
| 22 | V-900 (20) | 550 (60) | 70 (550) | 5 | 5# | |
| 23 | | NA | | | | WPH Carbon (100) |
| 24 | V-900 (19.9) | 250 (60) | 59.7 (550) | 5.98 | 4.98 | WPH Carbon (9.95) Avicel Cellulose (0.5) |
| 25 | Sol P2 (20) | 250 (60) | 70 (550) | 5 | 5 | |

| Entry | TCE influent concentration Run A | TCE effluent concentration 5th bed volume (% reduction) Run A | TCE influent concentration Run B | TCE effluent concentration 5th bed volume (% reduction) Run B |
|---|---|---|---|---|
| 1 | 1.0 ppm | <50 ppb (>95%) | | |
| 2 | 50.0 ppm | 29.4 ppm (59) | 5.0 ppm | 0.5 ppm (90) |
| 3 | 5.0 ppb | 0.20 ppb (96) | | |
| 4 | rejected* | | | |
| 5 | 50.0 ppm | 1.0 ppm (98) | 5.0 ppm | 0.1 ppb (98) |
| 6 | 5.0 ppb | 0.07 ppb (98) | | |
| 7 | 5.0 ppb | 0.06 ppb (99) | | |
| 8 | 5.0 ppb | 0.07 ppb (99) | | |
| 9 | 50.0 ppb | 50.4 ppb (0) | 50.0 ppm | 49.6 ppm (1) |
| 10 | 50 ppm | 39.5 ppm (21) | 50.0 ppb | 39.9 ppm (20) |
| 11 | 50.0 ppm | 39.3 ppm (21) | 50.0 ppb | 45.8 ppm (8) |
| 12 | 50.0 ppm | 37.2 ppm (26) | 50.0 ppb | 41.0 ppb (18) |
| 13 | 50.0 ppm | 21.2 ppm (58) | 50.0 ppb | 34.0 ppb (32) |
| 14 | rejected** | | | |
| 15 | rejected** | | | |
| 16 | rejected** | | | |
| 17 | rejected** | | | |
| 18 | 50.0 ppm | 42.8 ppm (14) | 50.0 ppb | 44.4 ppb (11) |
| 19 | 50.0 ppm | 36.3 ppm (27) | 50.0 ppb | 41.9 ppb (16) |
| 20 | 50.0 ppm | 27.8 ppm (44) | 50.0 ppb | 27.0 ppb (46) |
| 21 | 50.0 ppm | 24.8 ppm (50) | 50.0 ppb | 17.5 ppb (65) |
| 22 | 50.0 ppm | 42.7 ppm (15) | 50.0 ppb | 20.3 ppb (59) |
| 23 | rejected* | | | |
| 24 | 50.0 ppm | <5.0 ppm (>90) | 50.0 ppb | 3.9 ppb (92) |
| 25 | 50.0 ppm | 5.8 ppm (88) | 50.0 ppb | 11.3 ppb (77) |

*sample did not allow water flow
**particle fell apart upon use
PVP = GAF PVP K-60 Polyvinylpyrrolidone TABLE 10-continued V-900 = LaRoche V-900 gel alumina (colloidal alumina)
Sol P2 = Condea Disperal Sol P2 (colloidal alumina)
Zeolite = Zeolyst international CBV 100
CuO = Fisher C472
$MnO_2$ = Kerr-McGee KM ® Electrolytic Manganese Dioxide 92% MnO2 X-ray powder diffraction studies indicate this to be a mixture of manganese oxides.
Tin = Fisher T128
Zinc = Fisher Z16
MethylCellulose = Fisher M352
WHP Carbon = Calgon WPH powdered activate carbon
particle heated to 550° C. in air to convert $MnO_2$ to $Mn_3O_4$
NA = not applicable

EXAMPLE 13

Various adsorbent and/or catalyst and binder systems of Table 11 were prepared according to the procedures of Examples 11 and Example 12 (aluminum oxide preparation). Samples were tested to determine if they reacted with hydrogen sulfide at room temperature. Hydrogen sulfide was generated by treating sodium sulfide with sulfuric acid and vacuum transferred into an IR cell which had been loaded with 1.00 g of adsorbent and/or catalyst binder system to be tested. The IR cell used was 9 cm long by 4 cm in diameter (~120 mL volume). The cell was filled to approximately 170 torr $H_2S$ and observed visually and IR spectra recorded.

The percent composition of each component as well as the nature of the binder are presented in Table 11. The aluminum oxide particle was first calcined at 550°, then acid washed using 0.5% acetic acid and dried at 121° C. for 90 minutes using the same procedure described in Example 12. The cross-linking temperature for each particle was 250° C. for 1 hour.

The removal of hydrogen sulfide using the adsorbent and/or catalyst and binder systems of the present invention was investigated, and these results are summarized in Table 11. The removal of hydrogen sulfide by the adsorbent and/or catalyst binder systems was monitored by infrared spectroscopy. Based on these results, adsorbent and/or catalyst and binder systems of colloidal aluminum binder, acid treated aluminum oxide, and copper oxide provided the best results with regards to the removal of hydrogen sulfide.

EXAMPLE 14

TCE adsorption and TCLP extraction procedures were performed as follows. A 20.0114-gram (about 24.50 mL bed volume) sample of the colloidal alumina and $Al_2O_3$/CuO/$MnO_2$ combination particle of Table 11, entry 1, after treatment with TCE was wet packed into a 50-mL buret (with removable stopcock) plugged with glass wool. The sample was charged with five bed volumes of water. The sorbent material was then quantitatively transferred into the Zero Headspace Extractor (ZHE) apparatus into which 200 mL of water was added, appropriately sealed and agitated for 18 hours. The filtered solution was collected in two 100 mL vials, stored in the refrigerator at 4° C. until analysis by GC/MS. The Finnigan MAT Magnum ion trap GC/MS equipped with a Tekmar liquid sample concentrator (LSC 2000) was used for analysis.

The calibration curve procedure was as follows. A freshly prepared 50 ppm TCE stock solution was obtained by dissolving 34.2 µl spectrophotometric grade TCE (Aldrich) in 20 ml HPLC grade methanol (Fisher) followed by dilution to a liter. Dilution of this solution (1000 µl:1L) resulted in a 50 ppb TCE stock solution. All dilutions were accomplished using deionized water. A calibration curve was constructed by purging 1.0, 0.50, 0.20, 0.10, and 0.050 ppb TCE solutions.

TABLE 11

| Entry | Binder (Wt %) | $Al_2O_3$ wt % | ZnO wt % | CuO wt % | Length of Experiment to Remove $H_2S$ | $H_2S$ reacted | Comments |
|---|---|---|---|---|---|---|---|
| 1 | V-900 (40) | 50 | 10 | | 16 h | Yes | Virtually all absorbed as determined IR |
| 2 | V-900 (50) | 40 | 10 | | 24 h | Yes | Virtually all absorbed as determined IR |
| 3 | V-900 (60) | 30 | 10 | | 42 h | Yes | Discoloration observed after 4 h |
| | | | | | | | Virtually all absorbed as determined IR |
| 4 | V-900 (20) | 60 | 10 | 10 | 24 h | Yes | Virtually all absorbed as determined IR |
| 5 | V-900 (20) | 60 | 20 | | 2 h | Yes | Discoloration observed after 2 h |
| | | | | | | | Virtually all absorbed as determined IR |
| 6 | V-900 (25) | 70 | | 5 | 2 h | Yes | Discoloration observed after 2 h |
| | | | | | | | Virtually all absorbed as determined IR |
| 7 | V-900 (38) | 60 | | 2 | 3 h | Yes | Discoloration observed after 3 h |
| | | | | | | | Virtually all absorbed as determined IR |
| 8 | V-900 (30) | 50 | | 20 | 1.5 h | Yes | Discoloration observed after 1.5 h |
| | | | | | | | Virtually all absorbed as determined IR |
| 9 | V-900 (30) | 20 | | 50 | 16.5 h | Yes very slowly | Very slow litter change after 2 h |
| 10 | V-900 (30) | 69 | | 1 | 4 h | Yes | Discoloration observed after 2 h |
| | | | | | | | Virtually all absorbed as determined IR |

$Al_2O_3$ = calcinated at 550° C. and then acid treated
V-900 = LaRoach V-900 gel alumina (colloidal alumina)

The results are set forth below in Table 12.

TABLE 12

| Sorbent Sample | TCE found, ppb | TCE Detection limit, ppb |
|---|---|---|
| Table 11, entry 1 | Nd[a] | 0.0050 |

[a]= Not detected. The fact that TCE in the sample is less that 500 ppb (EPA TCLP limit) characterizes it as a nonhazardous waste with respect to TCE.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for producing an acid enhanced adsorbent particle comprising contacting a particle comprising a non-amorphous, non-ceramic, crystalline, porous, calcined, aluminum oxide particle that was produced by calcining at a particle temperature of from 400° C. to 700° C., with a dilute acid for a sufficient time to increase the adsorbent properties of the particle, wherein the resultant acid treated aluminum oxide is not subsequently calcined, wherein the acid contacting is more than a surface wash but less than an etching of the particle.

2. The process of claim 1, wherein the acid comprises acetic, nitric, sulfuric, hydrochloric, boric, formic, or phosphoric acid, or mixtures thereof.

3. The process of claim 1, wherein the acid comprises acetic acid.

4. The process of claim 1, wherein the contacting is by dipping or submerging the particle in acid.

5. The process of claim 1, further comprising the step of rinsing the particle to remove excess acid.

6. The process of claim 5, further comprising the step of drying the particle.

7. The process of claim 1, wherein the contacting is for at least 15 minutes.

8. The process of claim 1, wherein the dilute acid strength is equivalent to an aqueous acetic acid solution at less than or equal to 0.09N.

9. The process of claim 1, wherein the dilute acid strength is equivalent to an aqueous acetic acid solution at less than or equal to 0.02N.

10. The process of claim 1, wherein the calcined aluminum oxide is in the gamma, chi-rho, or eta form.

11. The process of claim 1, wherein the aluminum oxide prior to or after acid treatment is not sintered.

12. The process of claim 1, wherein the particle consists essentially of aluminum oxide.

13. The process of claim 1, wherein the particle consists of aluminum oxide.

14. The process of claim 1, wherein the resultant acid treated aluminum oxide is substantially microporous.

15. The process of claim 1, wherein the resultant acid treated aluminum oxide is not an adsorbent support or catalyst support.

16. The process of claim 1, wherein the dilute acid strength is equivalent to an aqueous acetic acid solution at less than or equal to 0.25N.

17. The process of claim 1, wherein the dilute acid strength is equivalent to an aqueous acetic acid solution at less than or equal to 0.1N.

18. The process of claim 1, wherein the dilute acid strength is equivalent to an aqueous acetic acid solution at less than or equal to 0.075N.

19. The process of claim 1, wherein the dilute acid strength is equivalent to an aqueous acetic acid solution at less than or equal to 0.05N.

20. The process of claim 1, wherein the dilute acid strength is equivalent to an aqueous acetic acid solution at less than or equal to 0.01N.

21. The process of claim 1, wherein the dilute acid strength is equivalent to an aqueous acetic acid solution at less than or equal to 0.005N.

22. The process of claim 1, wherein the dilute acid strength is equivalent to an aqueous acetic acid solution at less than or equal to 0.001N.

23. The process of claim 16, wherein the lower strength of the acid is equivalent to a 0.0001N aqueous acetic acid solution.

24. The process of claim 17, wherein the lower strength of the acid is equivalent to a 0.0001N aqueous acetic acid solution.

25. The process of claim 18, wherein the lower strength of the acid is equivalent to a 0.0001N aqueous acetic acid solution.

26. The process of claim 19, wherein the lower strength of the acid is equivalent to a 0.0001N aqueous acetic acid solution.

27. The process of claim 20, wherein the lower strength of the acid is equivalent to a 0.0001N aqueous acetic acid solution.

28. The process of claim 21, wherein the lower strength of the acid is equivalent to a 0.0001N aqueous acetic acid solution.

29. The process of claim 22, wherein the lower strength of the acid is equivalent to a 0.0001N aqueous acetic acid solution.

30. The process of claim 1, wherein the calcining temperature is from 400° C. to 650° C.

31. The process of claim 1, wherein the calcining temperature is from 400° C. to 600° C.

32. The process of claim 1, wherein the calcining temperature is from 400° C. to 550° C.

33. The process of claim 1, wherein the calcining temperature is from 400° C. to 500° C.

34. The process of claim 1, wherein the aluminum oxide comprises gamma aluminum oxide.

35. The process of claim 1, wherein the particle, prior to contacting with the acid, further comprises a second type of adsorbent and/or catalytic particle and further comprises a binder comprising a colloidal metal oxide or colloidal metalloid oxide.

36. The process of claim 35, wherein the binder is cross-linked to at least one of the particle types or to itself.

37. The process of claim 1, further comprising,
  (b) mixing the resultant particle of claim 1 with at least one other type of adsorbent and/or catalyst particle, a binder comprising colloidal metal oxide or colloidal metalloid oxide, and an acid; and
  (c) heating the mixture to a sufficient temperature for a sufficient time to cross-link the binder to at least one type of particle or to itself.

38. The particle made by the process of claim 1.

39. The particle made by the process of claim 3.

40. The particle of claim 38, wherein said particle passes the EPA TCLP test for a particular contaminant.

41. The particle of claim 40, wherein said contaminant is lead.

42. A composition comprising the aluminum oxide particle made by the process of claim 1.

43. The composition of claim 42, further comprising a second oxide adsorbent particle.

44. The composition of claim 43, further comprising a cross-linked colloidal aluminum oxide binder.

45. The composition of claim 42, further comprising silicon dioxide, manganese oxide, copper oxide, vanadium pentoxide, zirconium oxide, iron oxide or titanium dioxide.

46. The composition of claim 42, further comprising a zeolite.

47. The composition of claim 42, further comprising copper oxide and manganese oxide, wherein said copper oxide and said manganese oxide have not been acid enhanced.

48. The composition of claim 47, wherein the composition comprises 50–98 parts by weight of said acid enhanced aluminum oxide, 1–49 parts by weight of said copper oxide, and 1–49 parts by weight of said manganese oxide.

49. The composition of claim 48, wherein said copper oxide is CuO and said manganese oxide is $MnO_2$.

50. The composition of claim 47, wherein said composition passes the EPA TCLP test for trichloro ethylene.

51. The composition of claim 42, further comprising a noble metal.

52. The composition of claim 42, further comprising a catalyst particle.

53. The composition of claim 42, further comprising a second adsorbent particle.

54. The composition of claim 43, wherein the second oxide adsorbent particle comprises an oxide of aluminum, titanium, copper, vanadium, silicon, manganese, iron, zinc, zirconium, tungsten, rhenium, arsenic, magnesium, thorium, silver, cadmium, tin, lead, antimony, ruthenium, osmium, cobalt, or nickel, or a combination thereof.

55. The composition of claim 53, wherein the second adsorbent particle comprises activated carbon.

56. A process for producing an acid enhanced adsorbent particle consisting essentially of contacting a particle comprising a non-amorphous, non-ceramic, crystalline, porous, calcined, aluminum oxide particle that was produced by calcining at a particle temperature of from 400° C. to 700° C., with a dilute acid for a sufficient time to increase the adsorbent properties of the particle, wherein the resultant acid treated aluminum oxide is not subsequently calcined, wherein the acid contacting is more than a surface wash but less than an etching of the particle.

* * * * *

UNITED STATES PATENT AND TRADEMARK OFFICE
CERTIFICATE OF CORRECTION

| | |
|---|---|
| PATENT NO. | : 5,985,790 |
| DATED | : November 16, 1999 |
| INVENTOR(S) | : Moskovitz and Kepner |

Page 1 of 1

It is certified that error appears in the above-identified patent and that said Letters Patent is hereby corrected as shown below:

Title page,
    The title page does not recite the claim to priority. Please insert the following -- (1) Continuation-in-part of U.S. application serial No. 08/662,331, filed June 12, 1996, abandoned, which is a continuation-in-part of PCT/US95/15829, filed June 12, 1995, which is a continuation-in-part of U.S. application serial No. 08/351,600, filed December 7, 1994, abandoned, and (2) a continuation-in-part of PCT/US95/15829, filed June 12, 1995, which is a continuation-in-part of U.S. application serial No. 08/351,600, filed December 7, 1994, abandoned. --

Signed and Sealed this

Twenty-third Day of October, 2001

Attest:

*Nicholas P. Godici*

NICHOLAS P. GODICI
*Attesting Officer*     *Acting Director of the United States Patent and Trademark Office*